(12) United States Patent
Eaton et al.

(10) Patent No.: US 8,110,150 B2
(45) Date of Patent: Feb. 7, 2012

(54) BULK POLYMERIZATION REACTORS FOR PRODUCING DRAG REDUCER

(75) Inventors: Gerald B. Eaton, Houston, TX (US); Alan Ebert, Houston, TX (US)

(73) Assignee: Beta Technologie AG, Bern (CH)

(*) Notice: Subject to any disclaimer, the term of this patent is extended or adjusted under 35 U.S.C. 154(b) by 182 days.

(21) Appl. No.: 12/589,749

(22) Filed: Oct. 28, 2009

(65) Prior Publication Data

US 2011/0097244 A1 Apr. 28, 2011

Related U.S. Application Data

(60) Continuation of application No. 11/507,271, filed on Aug. 21, 2006, which is a continuation of application No. 11/406,110, filed on Apr. 18, 2006, now Pat. No. 7,534,403, which is a division of application No. 10/170,785, filed on Jun. 12, 2002, now Pat. No. 7,582,708.

(60) Provisional application No. 60/297,931, filed on Jun. 13, 2001.

(51) Int. Cl.
*B01J 19/00* (2006.01)

(52) U.S. Cl. .......... 422/138; 422/600; 422/601

(58) Field of Classification Search .......... 422/130, 422/600, 601, 603
See application file for complete search history.

(56) References Cited

U.S. PATENT DOCUMENTS

| | | | | | |
|---|---|---|---|---|---|
| 3,140,917 | A | * | 7/1964 | Klein | 422/138 |
| 3,842,904 | A | * | 10/1974 | Gardenier | 165/145 |
| 2002/0192133 | A1 | * | 12/2002 | Eaton et al. | 422/198 |
| 2005/0222346 | A1 | * | 10/2005 | Kommareddi et al. | 526/65 |
| 2006/0281877 | A1 | * | 12/2006 | Eaton et al. | 526/72 |
| 2007/0245560 | A1 | * | 10/2007 | Matsuzaki et al. | 29/890.039 |

FOREIGN PATENT DOCUMENTS

GB     2054819 A  *  2/1981

* cited by examiner

*Primary Examiner* — Walter D Griffin
*Assistant Examiner* — Huy-Tram Nguyen
(74) *Attorney, Agent, or Firm* — The Matthews Firm

(57) ABSTRACT

A polymerization reactor for creating drag-reducing polymer having a reservoir and at least one heat exchanger plate in fluid communication with a coolant source, wherein each heat exchanger plate may be disposed on a lid. The heat exchanger plates are treated and/or covered to provide that the exchanger plates can be readily disengaged from the drag-reducing polymer. The polymerization reactors of the present invention permit large amounts of polymer to be formed in each reactor batch. Preferably, polymers are formed in the polymerization reactor by bulk polymerization. Methods for forming drag-reducing polymers are also disclosed.

12 Claims, 19 Drawing Sheets

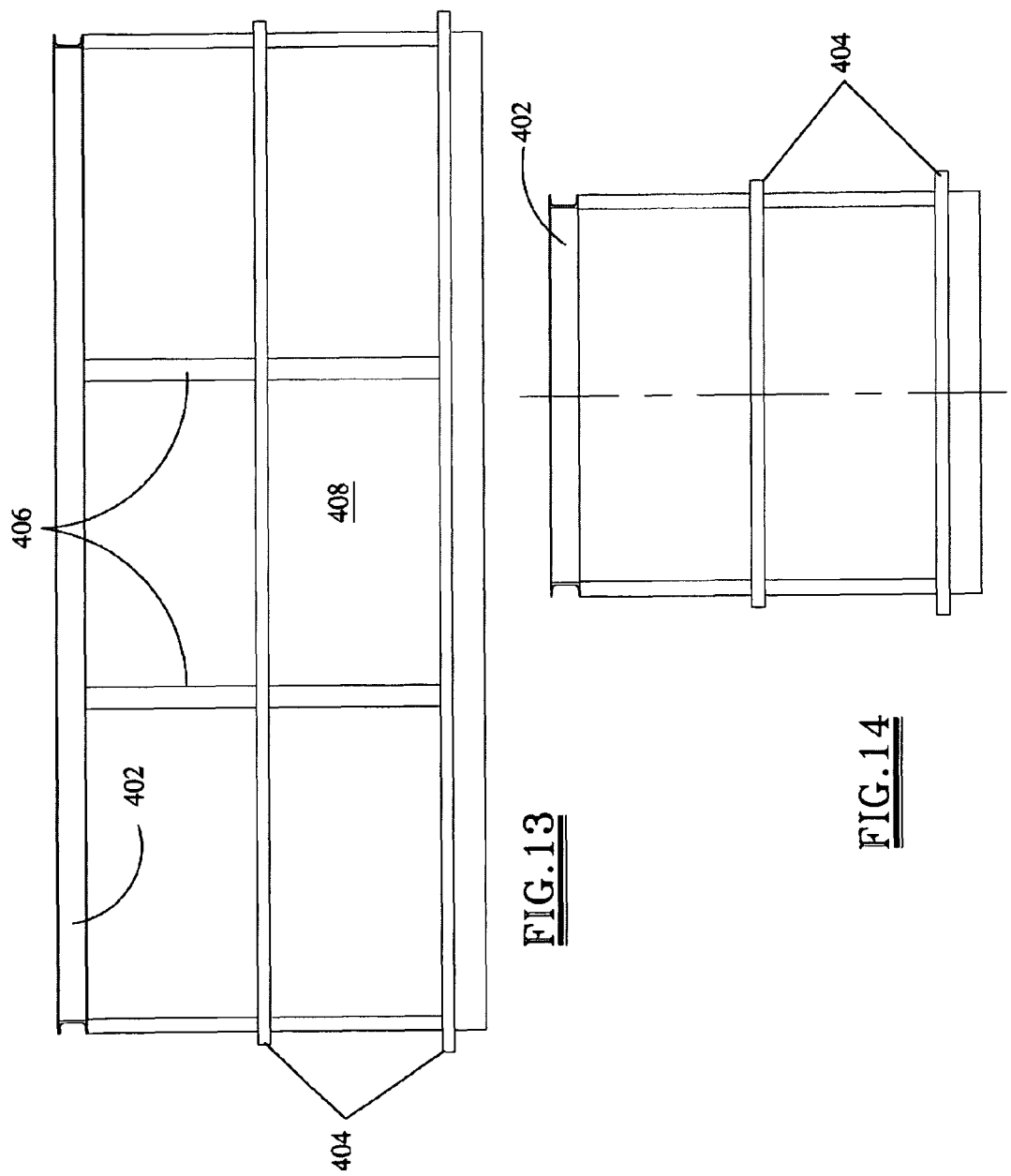

BULK POLYMERIZATION REACTORS FOR PRODUCING DRAG REDUCER

RELATED APPLICATION

This application is a continuation application of the pending U.S. patent application Ser. No. 11/507,271, filed Aug. 21, 2006. Application Ser. No. 11/507,271 is a continuation of U.S. patent application Ser. No. 11/406,110, filed Apr. 18, 2006, now U.S. Pat. No. 7,534,403. application Ser. No. 11/406,110 is a divisional of U.S. patent application Ser. No. 10/170,785, filed Jun. 12, 2002, now U.S. Pat. No. 7,582,708. Application Ser. No. 10/170,785 claims the benefit of U.S. Provisional Patent Application Ser. No. 60/297,931, filed Jun. 13, 2001.

FIELD OF THE INVENTION

This invention relates to reactors for conducting polymerization of monomers for the production of drag reducing agent ("DRA"), and in particular, bulk polymerization reactors for conducting polymerization of alpha-olefin monomers for the production of drag reducing agent.

BACKGROUND OF THE INVENTION

Formation of polymers from various monomers for creating drag reducing polymer is a well-known art. As is also well known in the art, the polymerization reactor in which the polymers are formed from the monomers have certain inherent limitations to efficiently form the polymers. A major inherent limitation is the removal of heat from the polymerization reactor created by the chemical reaction between the monomers and the catalyst during formation of the drag reducing polymers. To overcome this problem, cooling systems have been designed to encase the polymerization reactor in an attempt to remove the heat from the polymerization reactor. Additionally, cooling additives may be included in the polymerization reaction mixture in the polymerization reactor. Still further, extremely small reactors have been used to increase the surface area per unit mass, and such small reactors have been in the form of plastic bags.

All of these prior attempts, however, have various shortcomings. For example, the use of cooling systems outside the polymerization reactor do not efficiently and effectively remove heat from the polymerization reactor, especially for the center most region of the polymerization reactor. Accordingly, the size of the polymerization reactor must be small and limited amounts of polymer may be formed in each reactor batch. Additionally, with respect to the addition of cooling additives to the polymerization reactants, these cooling additives can have an adverse effect on the quality of the drag reducing polymer as well as increasing the cost associated with forming the polymer.

In other prior attempts, as discussed in U.S. Pat. Nos. 5,449,732, 5,504,131, and 5,504,132, the polymerization reactor is a crystalline, hydrocarbon-insoluble organic polymer reaction enclosure capable of substantially preventing passage of oxygen and water, i.e., plastic bags. Use of these plastic bags permits the polymerization reaction to be carried out without a cooling system or addition of cooling additives. However, because the plastic bags are not provided with any assistance in the removal of heat from the polymerization reaction, only small amounts of polymer reactants, e.g., monomer and catalyst, can be included in each plastic bag. As such, only small amounts of drag reducing polymer can be formed in each of this type of polymerization reactor. Further, the plastic bags cannot be easily separated from the drag-reducing polymer, and thus, the plastic bags and the drag-reducing polymer are typically merged or ground together into the final DRA product. Thus, the making of the drag-reducing polymer creates a polymer that is contaminated with its own manufacturing process. Such drag-reducing polymer is not readily useable in, for example, product pipelines because of the contamination caused by the bag particles. Further, such known procedures for manufacturing drag reducing polymer require the enclosure of the polymer in an environment that prevents the reaction of the DRA polymer with unwanted reactants; thus the use of the plastic bags. But the use of plastic bags limits the mass of product that can be made in one bag because the reaction is exothermic, and if not controlled, then an effective DRA product is destroyed during its manufacture.

Accordingly, prior to the development of the present invention, there has been no polymerization reactor or process for forming drag reducing polymers, which: effectively remove heat away from the polymerization reactor; permit the formation of a large amount of drag reducing polymer in each polymerization reactor; do not require the addition of cooling additives; can create pristine DRA without contaminates such as for example plastic bag particles; is isolated in an environment that enhances the creation and preservation of highly effective DRA product; and permit the use of a re-useable polymerization reactor. Therefore, the art has sought a polymerization reactor and a process for forming drag reducing polymers, which: effectively remove heat away from the polymerization reactor; permit the formation of a large amount of polymer in each polymerization reactor; do not require the addition of cooling additives; and permit the use of a re-useable polymerization reactor.

It is, therefore, a feature of the present invention to provide a reactor and method that creates highly effective DRA polymer.

A feature of the present invention is to provide an effective DRA reactor and method that effectively removes heat from the DRA polymerization reactor.

Another feature of the present invention is to provide an effective DRA reactor and method that permits the formation of a large amount of polymer in each polymerization reactor.

Another feature of the present invention is to provide an effective DRA reactor and method that does not require the addition of cooling additives.

Another feature of the present invention is to provide an effective DRA reactor and method that permits the use of a re-useable polymerization reactor.

Yet another feature of the invention is to provide an effective DRA reactor and method that has better plastic bag release characteristics.

Still another feature of the present invention is utilizing an effective DRA reactor and method that creates pristine DRA product.

Another feature of the present invention is to provide an effective DRA reactor and method that assists in reducing the formation of or assisting the elimination of nonfunctional polymers or unreacted olefins from the process.

Yet another feature of the present invention is to provide an effective DRA reactor and method that removes contaminants from DRA reactor before initiating the reaction process.

Another feature of the present invention is to provide an effective DRA reactor and method that prevents contaminants from entering during the reaction process.

Yet another feature of the present invention is to provide an effective DRA reactor and method that can be adjusted during the polymerization process to compensate for the inadvertent addition of unwanted contaminates such as by way of example and without limitation ambient air entering due to faulty sealing along any of the joining parts.

Still another feature of the present invention is to provide an effective DRA reactor and method that removes the unwanted moisture from the reactor continuously during the polymerization process.

Yet still another feature of the present invention to provide an effective DRA reactor and method with nitrogen ports and valves to fully purge ambient air from the system for eliminating any contaminants prior to loading the reactant mixture.

Yet further, an additional feature of the present invention to provide an effective DRA reactor and method with valves on the nitrogen ports to control the flow of nitrogen into the reactor as well as out of the reactor, whereby partially closing the exhaust valve allows a slight positive pressure within the reactant chamber, which positive pressure compensates for any defects in the sealing system, and nitrogen will exhaust out of any faulty seals thereby preventing any contaminants from entering.

Yet another feature of the present invention is to provide an effective DRA reactor and method such that the bases can be fixedly attached or removable depending on which removal process is used.

Still further another feature of the present invention is to provide an effective DRA reactor and method where the plate separation can be adjusted according to the anticipated reaction process temperature.

Yet another feature of the present invention is to provide an effective DRA reactor and method that provides carbon steel cavities and exchanger plates where the surfaces are not treated, but allowed to form a thin layer of rust which acts as a lubricant allowing a plastic bag type removable film to slip out easier.

Yet still another feature of the present invention is to provide an effective DRA reactor and method that provides an effective DRA reactor and method that requires only inexpensive and/or basic sealing mechanisms between the lid, walls and base as the slightly positive nitrogen pressure in the system compensates for any defects or damaged seal points.

Yet still another feature of the present invention is to provide an effective DRA reactor and method that provides that the exchanger plates are not fixed to the lid but rather slid onto a guide attached to the lid allowing adjustment to the separation between plates if needed whereby the plates are then connected via flexible conduit to the coolant manifold.

Additional features and advantages of the invention will be set forth in part in the description which follows, and in part will become apparent from the description, or may be learned by practice of the invention. The features and advantages of the invention may be realized by means of the combinations and steps particularly pointed out in the appended claims.

SUMMARY OF THE INVENTION

In accordance with the invention, the foregoing advantages have been achieved through the present polymerization reactor for polymerization of olefins comprising: a reservoir having at least three side wall surfaces and a bottom wall surface thereby forming a reservoir cavity; at least one heat exchanger plate in fluid communication with a coolant source; and a lid having a top wall surface and an inner wall surface, wherein the at least one heat exchanger plate is disposed along inner wall surface.

A bulk polymerization reactor is provided for the bulk polymerization of olefins comprising a tank reactor, at least one heat exchanger plate and a lid. The tank reactor having at least three side-wall surfaces and a bottom wall surface thereby forming a reservoir cavity. The heat exchanger plate is in fluid communication with a coolant source. The lid has a top wall surface and an inner wall surface, wherein the heat exchanger plate is disposed along the inner wall surface such that the at least one heat exchanger plate is disposable within the reservoir cavity. Thereby, a unitary bulk polymerization reactor is provided in which a bulk polyolefin is formed in situ within the reservoir cavity and around the at least one heat exchanger plate within the reservoir cavity.

In another embodiment, a bulk polymerization reactor is provided for bulk polymerization of olefins comprising a tank reactor, a heat exchanger, a coolant inlet manifold, at least one coolant inlet conduit, at least one coolant outlet conduit, and a lid. The tank reactor has at least three side wall surfaces and a bottom wall surface thereby forming a reservoir cavity. The heat exchanger further comprises a heat exchanger assembly. The coolant inlet manifold is in fluid communication with a coolant source. The coolant inlet conduit is in fluid communication with at least one heat exchanger plate. The coolant outlet conduit is in fluid communication with at least one of the heat exchanger plates and in fluid communication with a coolant outlet manifold. The coolant outlet manifold is in fluid communication with the coolant source. The lid has a top wall surface and an inner wall surface, wherein at least one of the heat exchanger plates is disposed along the inner wall surface such that the heat exchanger plate is disposable within the reservoir cavity. Thus, a unitary bulk polymerization reactor is provided in which a bulk polyolefin is formed in situ within the reservoir cavity and around the heat exchanger plates within the reservoir cavity.

A further feature of the polymerization reactor is that the polymerization reactor may comprise four side-wall surfaces. Another feature of the polymerization reactor is that each of the four side-wall surfaces may have a square shape having a length and a height. An additional feature of the polymerization reactor is that two of the four side wall surfaces may have a length of at least two feet and a height of at least two feet and the other two of the four side wall surfaces may have a length of at least three feet and a height of at least two feet. Still another feature of the polymerization reactor is that the lid may be rectangularly shaped having a length and width, the length being at least three feet and the width being at least two feet. A further feature of the polymerization reactor is that the lid may include at least two heat exchanger plates. Another feature of the polymerization reactor is that each of the at least two heat exchanger plates may be disposed at a distance of at approximately three inches from each other. An additional feature of the polymerization reactor is that the polymerization reactor may further comprise at least one coolant inlet manifold in fluid communication with the coolant source and at least one coolant outlet manifold in fluid communication with the coolant source. Still another feature of the polymerization reactor is that the polymerization reactor may further comprise at least one coolant inlet conduit in fluid communication with the at least one coolant inlet manifold and in fluid communication with each of the at least one heat exchanger plates, and at least one coolant outlet conduit in fluid communication with the at least one coolant outlet manifold and in fluid communication with each of the at least one heat exchanger plates. A further feature of the polymerization reactor is that the lid may include a plate hanger assembly disposed along the inner wall surface for attaching each of the at least one heat exchanger plates to the inner wall surface of the lid. Another feature of the polymerization reactor is that each of the at least one heat exchanger plates may be in fluid communication with a coolant inlet conduit and a coolant outlet conduit. An additional feature of the polymerization reactor is that each of the coolant inlet conduits may be in fluid communication with a coolant inlet manifold and each of the coolant outlet conduits may be in fluid communication with a coolant outlet manifold. Still another feature of the polymerization reactor is that the coolant inlet manifold and the coolant outlet manifold may be in fluid communication with the coolant source. A further feature of the polymerization reactor is that the reservoir may include four walls having a length, the length for example being approximately 4 feet, and a width, the width for example being approximately 2 feet. Another feature of the polymerization reactor is that the inner wall surface of the lid may include at least 6 heat exchanger plates. An additional feature of the polymerization reactor is that each of the at least one heat exchanger plate may include a removable film.

In accordance with the invention, the foregoing advantages have also been achieved through the present polymerization reactor for polymerization of olefins comprising: a reservoir having at least three side wall surfaces and a bottom wall surface thereby forming a reservoir cavity; a heat exchanger, the heat exchanger having a heat exchanger assembly, coolant inlet manifold in fluid communication with a coolant source, at least one coolant inlet conduit in fluid communication with at least one heat exchanger plate, at least one coolant outlet conduit in fluid communication with each of the at least one heat exchanger plate and in fluid communication with a coolant outlet manifold, the coolant outlet manifold in fluid communication with the coolant source; and a lid having a top wall surface and an inner wall surface, wherein the at least one heat exchanger plate is disposed along inner wall surface.

A further feature of the polymerization reactor is that the polymerization reactor comprises four side wall surfaces, two of the four side wall surfaces having a length of at least two feet and a height of at least two feet, the other two of the four side wall surfaces having a length of at least three feet and a height of at least two feet, and the lid is rectangularly shaped having a length and a width, the length being at least three feet and the width being at least two feet.

In accordance with the invention, the foregoing advantages have also been achieved through the present method of polymerization comprising the steps of: inserting at least one heat exchanger plate into an enclosed cavity, completely purging the cavity of any contaminants with a gas, applying coolant to the exchangers plate, combining one or more monomer and one or more catalyst either in or outside the cavity to form a mixture which mixture will flow around the exchanger plates displacing the gas such that the cavity contains only mixture and gas, controlling the temperature of the exchanger plates for enhancing the formation of the reaction of the monomer and catalyst for creating the desired DRA polymer, removing the exchanger plates once the reaction has reached the desired state.

A further feature of the method of polymerization is that the method may further comprise the step of disposing a removable film on each of the at least one heat exchanger plate prior to inserting the at least one heat exchanger plate into the reservoir cavity.

The polymerization reactor and process for forming polymers have the advantages of: effectively remove heat away from the polymerization reactor; permit the formation of a large amount of drag reducing polymer in each polymerization reactor; do not require the addition of cooling additives; can create pristine DRA without contaminates such as for example plastic bag particles; is isolated in an environment that enhances the creation and preservation of highly effective DRA product; and permit the use of a re-useable polymerization reactor.

The present DRA reactor has practical limits for the spacing between the cooling members of approximately 0.25 inches to approximately 15 inches. However, it has been determined that the preferable range for the spacing between the cooling members of approximately 2 inches to approximately 5 inches.

BRIEF DESCRIPTION OF THE DRAWINGS

The accompanying drawings which are incorporated in and constitute a part of the specification, illustrate a preferred embodiment of the invention and together with alternate embodiments as well as the general description of the invention given above and the detailed description of the preferred embodiments given below, serve to explain the principles of the invention.

FIG. 13 is an elevation, partial view of the side of the sleeve illustrated in FIG. 9 of the reactor of the present invention.

FIG. 14 is an elevation, partial view of the end of the sleeve illustrated in FIG. 9 of the reactor of the present invention.

FIG. 23 is a perspective view of another embodiment of a reactor of the present invention.

While the invention will be described in connection with the preferred embodiment, it will be understood that it is not intended to limit the invention to that embodiment. On the contrary, it is intended to cover all alternatives, modifications, and equivalents, as may be included within the spirit and scope of the invention as defined by the appended claims.

The above general description and the following detailed description are merely illustrative of the generic invention, and additional modes, advantages, and particulars of this invention will be readily suggested to those skilled in the art without departing from the spirit and scope of the invention.

DETAILED DESCRIPTION OF THE PREFERRED EMBODIMENTS

Reference will now be made in detail to the present preferred embodiments of the invention as described in the accompanying drawings.

Broadly, the polymerization reactor of the present invention includes a reservoir and a lid having a heat exchanger. When the lid is placed on the reservoir, the heat exchanger is disposed within the reservoir thereby allowing it to provide cooling, i.e., removing heat from the contents of the reservoir.

Figure 1:
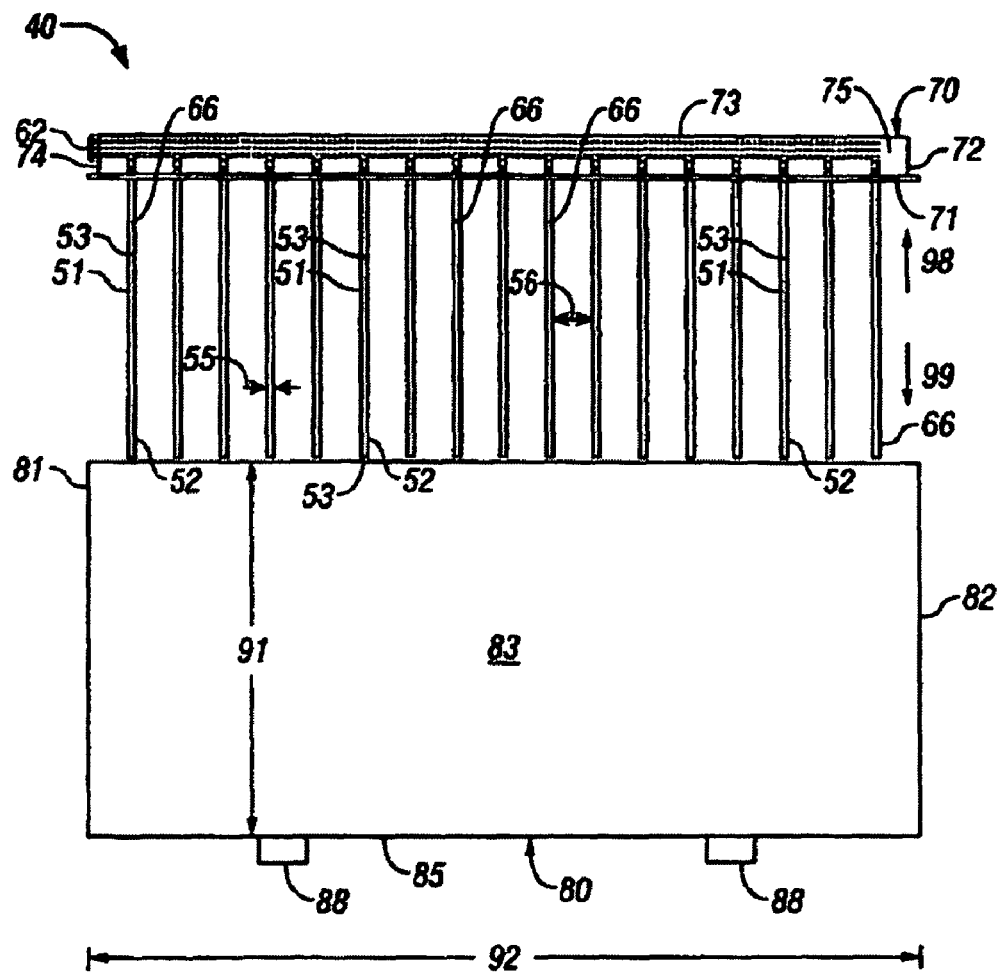
FIG. 1 is a side view of one embodiment of the polymerization reactor of the present invention.
Figure 2:
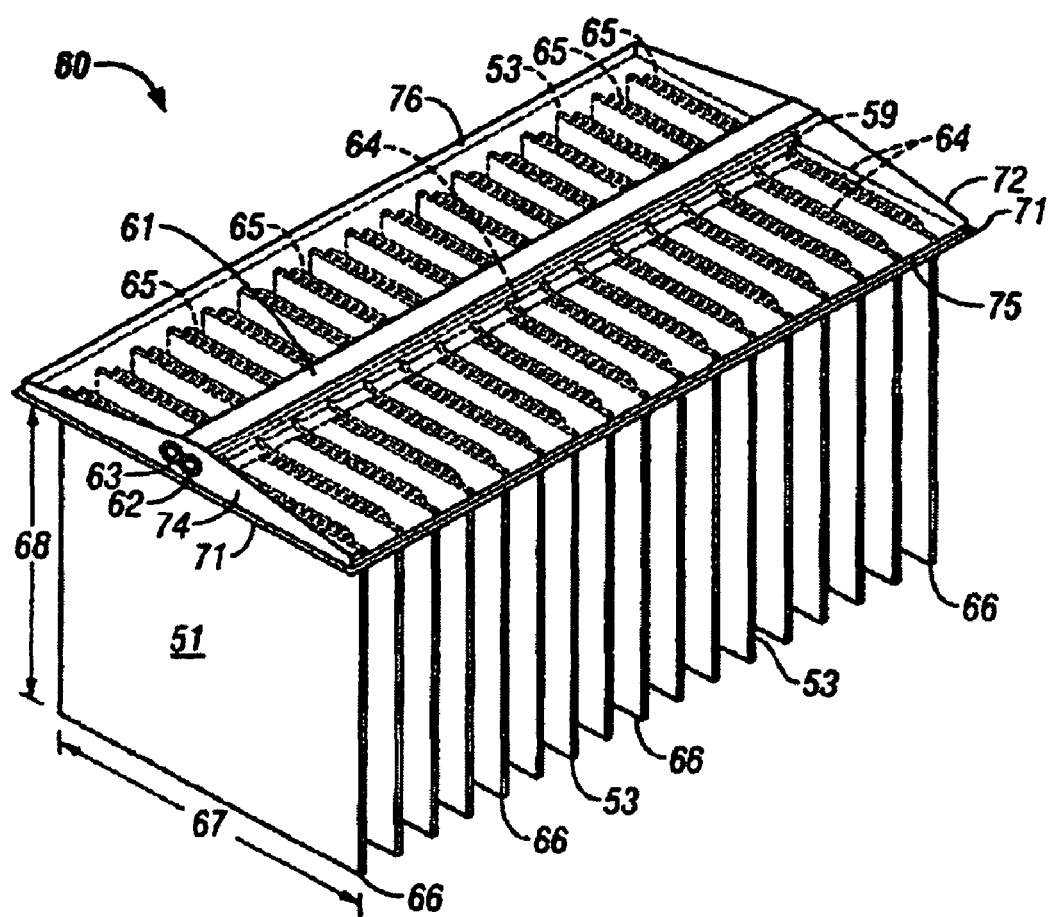
FIG. 2 is a perspective view of the heat exchanger of the polymerization reactor shown in FIG. 1.
Figure 3:
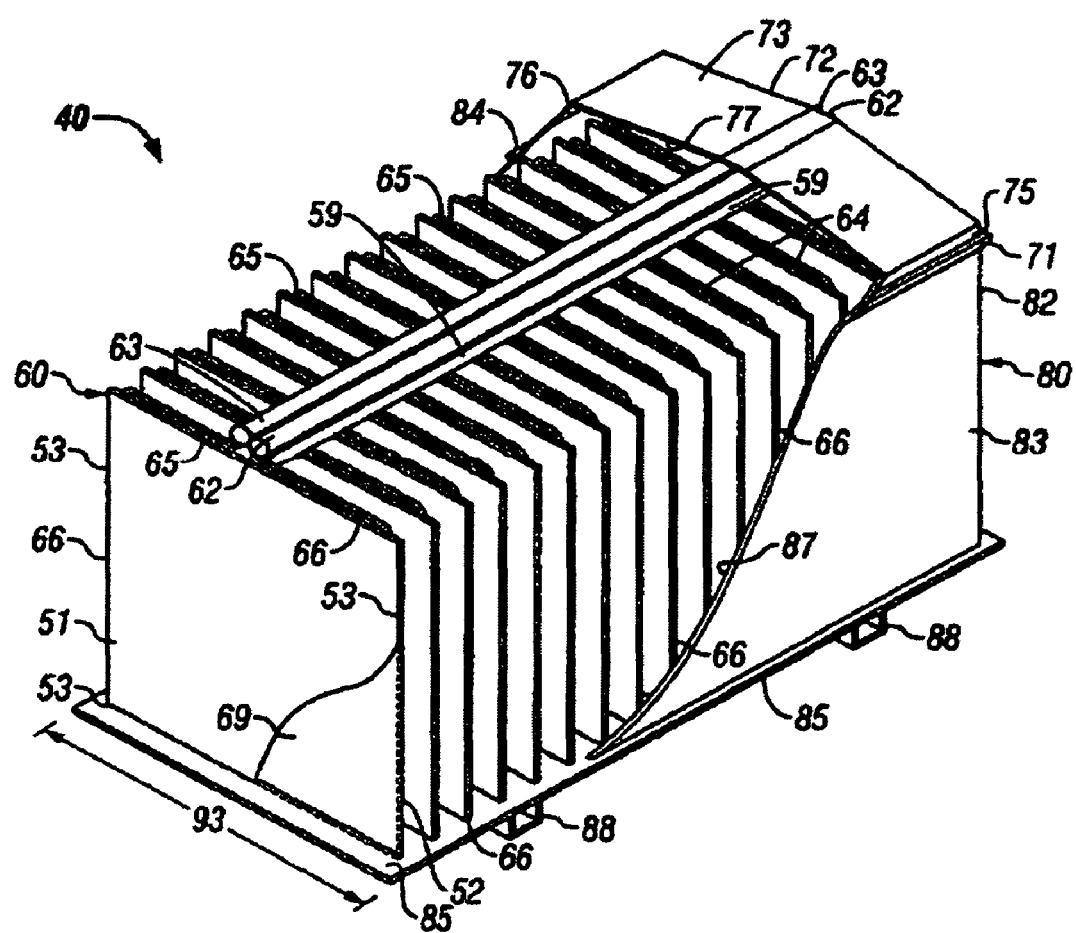
FIG. 3 is a perspective view of the polymerization reactor shown in FIG. 1.

Referring now to FIGS. 1-3, in one specific embodiment of the present invention, polymerization reactor 40 includes reservoir 80 and lid 70. Lid 70 includes heat exchanger 60. Reservoir 80 includes at least three wall surfaces and a bottom wall surface to form a cavity. As shown in FIGS. 1-3, reservoir preferably includes four side wall surfaces 81, 82, 83, 84, and bottom wall surface 85 to form reservoir cavity 87. While it is to be understood that additional wall surfaces may be included as part of reservoir 80, thereby permitting reservoir 80 to have any desired shape, preferably reservoir 80 includes four wall surfaces thereby having a rectangular shape (FIGS. 1-3), or cube shaped.

Reservoir 80 preferably includes at least one skid 88. As shown in FIGS. 1 and 3, reservoir 80 includes two skids 88. Skids 88 permit a forklift, or other lifting device, to engage reservoir 80 so that it can be moved to any desired location, i.e., to be placed near sources of monomer that are to be charged, or transported, into reservoir 80.

As shown in FIGS. 1 and 3, reservoir 80 includes length 92, height 91, and width 93. Length 92, height 91, and width 93 may be any distance as desired by the person using polymerization reactor 40. It is to be understood, however, that generally, as length 92 increases, the number of heat exchanger plates 66 also increases, and as height 91 and width 93 increase, the dimensions of heat exchanger plate 66 increases. In one specific embodiment, length 92, height 91, and width 93 are equal and each are at least 2 feet. In this embodiment, polymerization reactor 40 is cubed shaped. In a preferred embodiment, length 92 is at least 3 feet, height 91 is at least 2 feet, and width 93 is at least 2 feet. In this preferred embodiment, polymerization reactor 40 is rectangularly shaped.

Reservoir 80 may be formed out of any material known to persons of ordinary skill in the art. Preferably, reservoir 80 is formed out of stainless steel.

Referring now to FIGS. 1-3, lid 70 includes top wall surface 73 and side wall surfaces 72, 74, 75, 76. Lip 71 may be included to provide additional strength. Lid 70 provides support for the exchanger plates, closure for the reactant mixture cavity, and a top surface for all the required ports needed for the process. Lid 70 also includes an inner surface 77 to which heat exchanger 60 is attached. Lid 70 may be formed out of any material known to persons of ordinary skill in the art. Preferably, lid 70 is formed out of stainless steel.

Heat exchanger 60 preferably includes plate hanger assembly 61, coolant inlet manifold 62, coolant outlet manifold 63, at least one coolant inlet conduit 64, at least one coolant outlet conduit 65, and at least one heat exchanger plate 66 having exchanger cavity 69. Hanger assembly 61 preferably includes bracket 59 to permit attachment of each heat exchanger 66 to lid 70.

Coolant inlet manifold 62 is in fluid communication with at least one coolant inlet conduit 64 which is in fluid communication with heat exchanger plate 66. Likewise, coolant outlet manifold 63 is in fluid communication with at least one coolant outlet conduit 65 which is in fluid communication with heat exchanger plate 66. In one specific embodiment, having one heat exchanger plate 66, one of each of coolant inlet conduit 64 and coolant outlet conduit 65 is in fluid communication with coolant input manifold 62 and coolant outlet manifold 63, respectively. In other embodiments having more than one heat changer plate 66, as shown in FIGS. 1-3, each heat exchanger plate 66 includes at least one coolant inlet conduit 64 and one coolant outlet conduit 65 in fluid communication with coolant inlet manifold 62 and coolant outlet manifold 63, respectively. Therefore, coolant is permitted to pass from coolant source, through coolant inlet manifold 62, through each of the at least one coolant inlet conduits 64 into exchanger plate cavity 69 of each of the at least one heat exchanger plates 66, from the exchanger plate cavity 69 through coolant outlet conduit 65, through coolant outlet manifold 63 and back to coolant source. In so doing, heat is removed from the polymerization reaction mixture, i.e., the polymerization reaction mixture is cooled.

As discussed above, coolant inlet manifold 62 and coolant output manifold 63 are in fluid communication with coolant source. Acceptable coolant sources include, but are not limited to, refrigeration units readily known to persons of ordinary skill in the art employing a fluid (gas or liquid) for example, water, water-glycol mixtures, water-alcohol mixtures, dissolved mineral salts, e.g., sodium chloride and calcium chloride, cold gas, e.g., nitrogen and ammonium as coolants. In this arrangement, coolant may be circulated from the coolant source, through a conduit, e.g., pipe or flexible hose (not shown), into coolant inlet manifold 61. Coolant is then permitted to enter coolant inlet conduit 64 and into exchanger cavity 69 of each heat exchanger plate 66.

Coolant then is permitted to exit each exchanger cavity 69 of each heat exchanger plate 66 through coolant outlet conduit 65 and into coolant outlet manifold 63. Coolant is then transported back to coolant source from coolant outlet manifold 65 through a conduit, e.g., pipe or flexible hose (not shown) to be recharged, i.e., cooled, and circulated back through heat exchanger 60.

Referring now to FIGS. 1-2, each heat exchanger plate 66 is formed from front wall surface 51, back wall surface 52, and at least one side wall surface 53 to form cavity 69. The cavity is designed with compartments or partitions which direct flow throughout the cavity providing balanced heat exchange characteristics throughout the exchanger. The heat exchanger plate 66 also includes length 67, width 68, and thickness 55. Heat exchanger plate 66 may be any shape and formed out of any material desired or necessary to provide sufficient area to cool the polymerization reaction mixture in reservoir 80. Preferably, heat exchanger plate 66 is formed from aluminum. As shown in FIGS. 1-3, each heat exchanger plate 66 includes four side wall surfaces 53 although it is to be understood that heat exchanger plate 66 may be circularly shaped. In embodiments having more than one heat exchanger plate 66, each heat exchanger plate is disposed at a distance 56 from the next heat exchanger plate 66.

In a preferred embodiment, each heat exchanger plate 66 includes a removable film, e.g., plastic sheath, to prevent polymer formed in reservoir 80 during polymerization from adhering to each heat exchanger plate 66. Suitable removable films include plastic sheeting, plastic sheath, a spray-on non-stick substance that is incapable of being polymerized or contaminated and thus preventing reaction by the polymerization reaction mixture, for example, because the spray-on non-stick substance has a melting point higher than the temperature of the polymerization reaction mixture.

The number of heat exchanger plates 66 present in each embodiment of polymerization reactor 40 is determined by the size of reservoir 80. In the specific embodiment illustrated in FIGS. 1-4, reservoir 80 includes length 92 of 8 feet, 3 inches, height 91 of 4 feet, 1 inch, and width 93 of 4 feet, 3 inches, and each heat exchange plate 66 includes length 67 of 4 feet, width 68 of 4 feet, and thickness 55 of approximately ⅞ inch. Seventeen heat exchanger plates 66 are disposed along plate hanger assembly 61 with distance 56 between each heat exchanger plate of approximately 4 13/16 inches. It is to be understood that all of the foregoing dimensions may be altered as desired or necessary to provide sufficient cooling of the polymerization reaction mixture and to optimize polymer functionality.

The polymerization reactors 40 of the present invention may be used to polymerize monomers into polymers, and in particular, alpha olefin monomers into polyalphaolefins. As mentioned above, numerous polymerization methods, reactants, i.e., monomers, catalysts, co-catalysts, are known to persons of ordinary skill in the art. Additionally, bulk polymerization methods are known to persons of ordinary skill in the art. However, none of these known polymerization methods have been conducted in the polymerization reactors 80 discussed above.

A DRA reactor may have a detachable bottom, or may not. If the DRA reactor has a detachable bottom, the sidewalls are positioned on the bottom with a seal between the contacting surfaces of the bottom and the sidewalls. A removable film is applied to the exchanger plates, the inside walls of the sidewalls and the inside surface of the bottom such that the removable film defines the boundaries of a reaction chamber, except for the upper extremity which may be open.

The lid may have one or more of each of a purging port, a filling port, an inspection port, an access port, an inlet coolant port, a discharge coolant port, or any other port required for the specific production of a DRA product. Preferably, the lid has two purging ports located at opposite corners; two fill ports located for efficient filling with the filling ports centered between exchanger plates; an inspection port having a transparent member for observing the reaction chamber; an access port for taking samples or inserting temperature sensing devices; an inlet coolant port and a discharge coolant port connected to a manifold with valves as needed.

In one embodiment of the present invention, the exchanger plates are attached to the lid before engagement within the sidewalls and bottom, thus the removable film is attached to the exchanger plates without the obstruction of the sidewalls. And, the removable film is engaged with the sidewalls and the bottom to form an open chamber without the obstruction of the exchanger plates. After the removable film is attached to the exchanger plates, the exchanger plates, via the lid, are lowered into the chamber defined by the removable film engaged with the sidewalls and the bottom. A seal is provided at the contact points between the lid and the sidewalls and, if appropriate, between the sidewalls and the bottom. Thus, the reactor is sealed with respect to the engagement of the bottom, the sidewalls and the lid. A reaction chamber is defined by the removable film engaging the bottom and sidewalls to create an exterior boundary, and by the removable film covering the exchanger plates that segments the exterior boundary into multiple similar congruent and contiguous divisions.

The spacing of the exchanger plates is important. Generally, the exchanger plates can be between ¼ inch to 12 inches apart. It has been found that the practical range of spacing is in the range of ¼ inch to greater than 12 inches.

A purging gas is used to enhance the effectiveness of the present invention. One such purging gas is nitrogen. It is appreciated by those skilled in the art that other purging gases may be equally effective. Once the lid is sealed with the sidewalls, the nitrogen or other purging gas is engulfed within the sealed chamber. The nitrogen removes residual oxygen and other contaminants such as moisture out of the reactor. Further, the nitrogen removes nonfunctional polymers and unreacted olefins. The nitrogen ingresses through a first purging port, flows through the sealed chamber and egresses a second purging port remote from the first purging port. The purging ports are located relative to each other in such a manner as to provide nitrogen throughout the sealed chamber, such as for example, on opposite sides. A valve is associated with one or more of the purging ports to create a back-pressure or positive pressure within the sealed chamber. The back-pressure or positive pressure provides that any static zones within the sealed chamber are completely purged such that all air and moisture are purged from the sealed chamber. A further unexpected result is the back-pressure or positive pressure of nitrogen within the sealed chamber enhances the quality of the DRA product by preventing any air or moisture from entering the chamber during the polymerization process. Thus, if there is a leak during the polymerization process, such as by way of example in the seal between the sides and the lid, then the back-pressure or positive pressure of nitrogen within the sealed chamber prevents air or moisture from degrading the polymerization process. The complete purge of the reaction chamber with nitrogen or another appropriate perging gas is required to effectuate high quality DRA product. Typically, the positive pressure is less than 1 inch of mercury or 0.5 p.s.i., but in any case to enhance the effectiveness of the invention, the pressure differential is enough to offset any leaks that may exist. Maintaining a positive pressure in the reaction chamber achieves an unexpected result by significantly increasing the quality of the DRA product. It is important to one skilled in the art of DRA that the pressure differential in the reaction chamber is maintained to offset any leaks to achieve the quality of the product produced practicing the present invention.

Once the reaction chamber is completely purged with nitrogen, then the coolant is communicated through the exchanger plates. The exchanger plates are cooled, typically, until a temperature equilibration is reached among the plates. Upon the reaction chamber being completely purged with nitrogen and the exchanger plates reaching temperature equilibration, the reaction mixture is loaded into the reaction chamber. Initially, the reaction mixture easily flows around the exchanger plates. Shortly after loading begins, usually within minutes, the reaction has reached a point where the reaction mixture is no longer fluid and becomes static surrounding the exchanger plates. Once the desired fill level is reached, the flow of the reaction mixture into the chamber is stopped. The correct fill level is determined by the metering of the reaction mixture and by the use of the inspection window. The fill ports are closed. However, the purging with nitrogen continues. The purging with nitrogen begins when the lid is initially engaged with the sidewalls, continues throughout the loading of the reaction mixture, during the polymerization of the reaction mixture until the desired state of polymerization is reached, and the lid is removed. The desired state of polymerization results in a plurality of sticky, viscous blocks of polymer disposed between the walls and the exchanger plates. In one embodiment, when the lid is lifted, the exchanger plates are also lifted. It would be difficult, if not impossible, to remove the exchanger plates from the viscous blocks of polymer but for the removable film. If the removable film is a covering material like thin plastic, then the plastic removable film remains engaged with the viscous blocks of polymer and the exchanger plates are disengaged with the lid from the removable film-viscous blocks combination. If, on the other hand, the removable film is a spray-on or Teflon-like material, then the removable film would remain engaged with the exchanger plates. It can be appreciated that other various and sundry ways exist for enabling the separation of the exchanger plates from the viscous blocks of polymer. In any case, the exchanger plates are separated from the sticky, viscous blocks of polymer.

It is important that the exchanger plates can be readily disengaged from the sticky, viscous blocks of polymer. The inability to disengage the sticky, viscous blocks of polymer from the reactor components has been a great problem in prior known devices. Further, it has been found that the use of the plastic removable film remains removably affixed to the sticky, viscous blocks of polymer thereby preventing the sticky, viscous blocks of polymer from sticking together. Still further, the plastic removable film maintains a residual oxygen barrier for the DRA after it is removed from the reactor, thereby preventing degradation due to exposure to the atmosphere.

At the stage of removing the cooling, for example removing the exchanger plates, further polymerization may be required, but does not require intense cooling to achieve the final polymerization. Typically, the ambient air temperature is sufficient cooling to achieve the final polymerization. The lid and exchanger plates are replaced with a cover. The cover can be metal, plastic or the like. The cover provides that the purging with nitrogen can continue throughout the polymerization process. When the polymer reaches its final level of polymerization, the nitrogen purge can be stopped and the bulk blocks of polymer removed from the reactor. The bulk blocks of polymer are removed from the reactor by lifting the sleeve comprising the sidewalls from around the bulk blocks of polymer, thus leaving the blocks of polymer resting on the bottom or base of the reactor. The bulk blocks of polymer are placed on pallets and stored appropriately. If the reactor is constructed with the sidewalls affixed to the bottom, then the sidewall-bottom portion is inverted such that the bulk blocks of polymer are readily released onto a pallet. The bulk blocks of polymer are easily removed from the reactor due to the removable film or release agent that as applied initially.

The coolant temperatures associated with the exchanger plates can vary as appreciated by those skilled in the art of DRA. The coolant temperatures will vary in association with the anticipated reaction rate and the temperature of the reactant mixture during polymerization, as well as in association with the spacing of the exchanger plates. Generally, the coolant temperature is between 0-50 degrees F., and is increased if a faster reaction rate is desired. The reaction is complete once the reaction mixture has reached a predetermined state of polymerization. The predetermined state of polymerization is generally determined by the percent of monomers that have been converted into polymer. Generally, the percent of monomers that have been converted into polymer will be in the range of 50-97%, but could be lower if desired.

It is unexpected that the removable film can be readily removed from the sticky, viscous blocks of polymer. The prior art will grind the film material into the DRA product. However, grinding the film material into the DRA product results in an inferior product. Many DRA products that have ground the film material into the product should not be used in applications associated with specific products, such as for example, product pipelines. Also, it has been determined that it is better to remove the film at a reasonable time after the polymerization process is complete. A reasonable time to remove the film from the viscous blocks of polymer is determined by the state of polymerization, the thickness of the blocks of polymer, the ambient temperature, as well as other factors appreciated by those skilled in the art of DRA. Generally, it has been determined removing the film as soon as possible is preferable.

Figure 4:
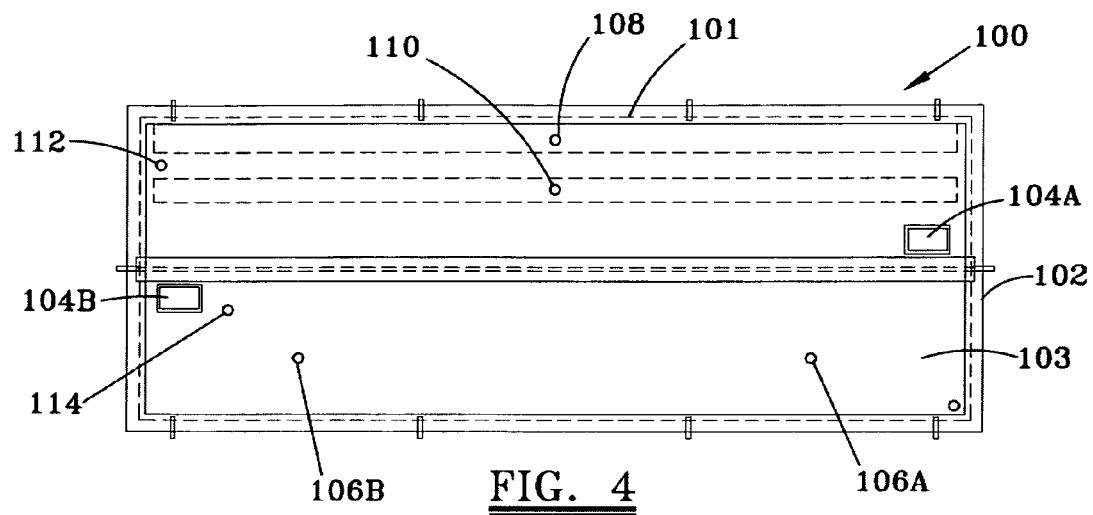
FIG. 4 is a top view of a lid of the reactor of the present invention.

FIG. 4 is a top view of a lid 100 of the reactor 40A of the present invention. The lid 100 of the reactor 40A of the present invention comprises the longitudinal sides 101, the short sides 102 which assist in forming the top 103. The top 103 has in it one or more fill ports 106A,106B, a coolant inlet 108, a coolant outlet 110, a nitrogen inlet 112, a nitrogen outlet port 112A remote from the inlet 112, a temperature port 114 and a window 104A,B.

Figure 5:
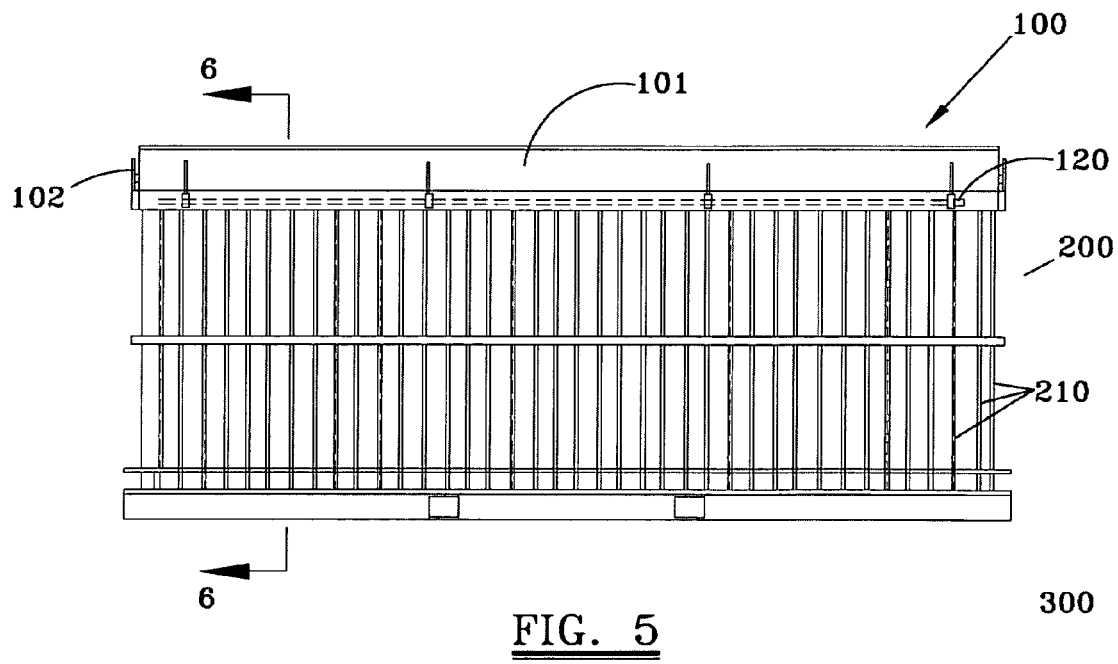
FIG. 5 is an elevation view of a lid, heat exchanger assembly and base of the reactor of the present invention.

FIG. 5 is an elevation view of a lid 100, a heat exchanger assembly 200 and base 300 of the reactor of the present invention. The lid 100 has the long sides 101, the short sides 102 and the hangers 120. The heat exchanger 200 comprises the plates 210.

Figure 6:
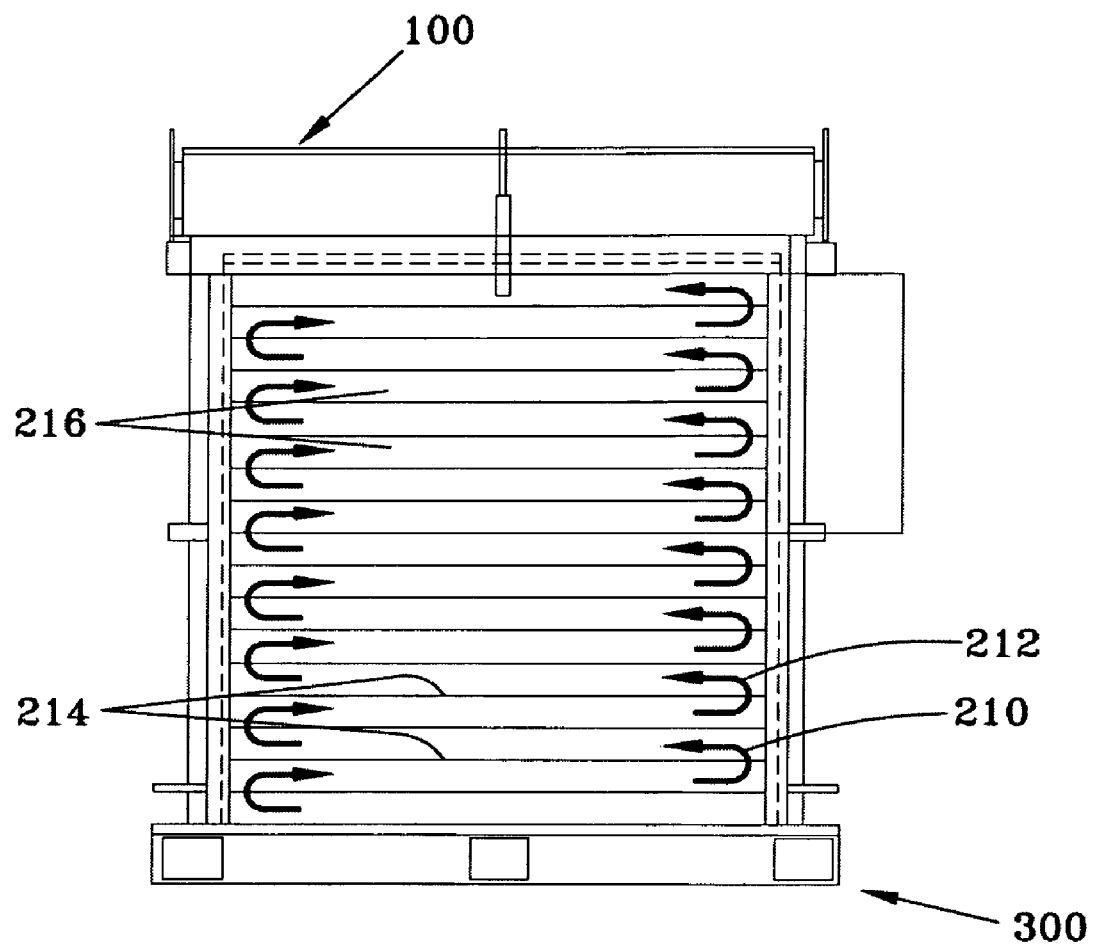
FIG. 6 is a cross sectional, elevation view of a heat exchanger plate illustrating a flow pattern associated with a cooling fluid associated with the reactor of the present invention.

FIG. 6 is a cross sectional, elevation view of one embodiment of a heat exchanger plate 210 illustrating a flow pattern associated with a cooling fluid associated with the reactor of the present invention. The heat exchanger plate 210 is between the lid 100 and the base 300. The heat exchanger plate 210 comprises an entrance channel 212, a plurality of separators 214 which form a plurality of compartments 216 that form a maze through which the coolant flows.

Figure 7:
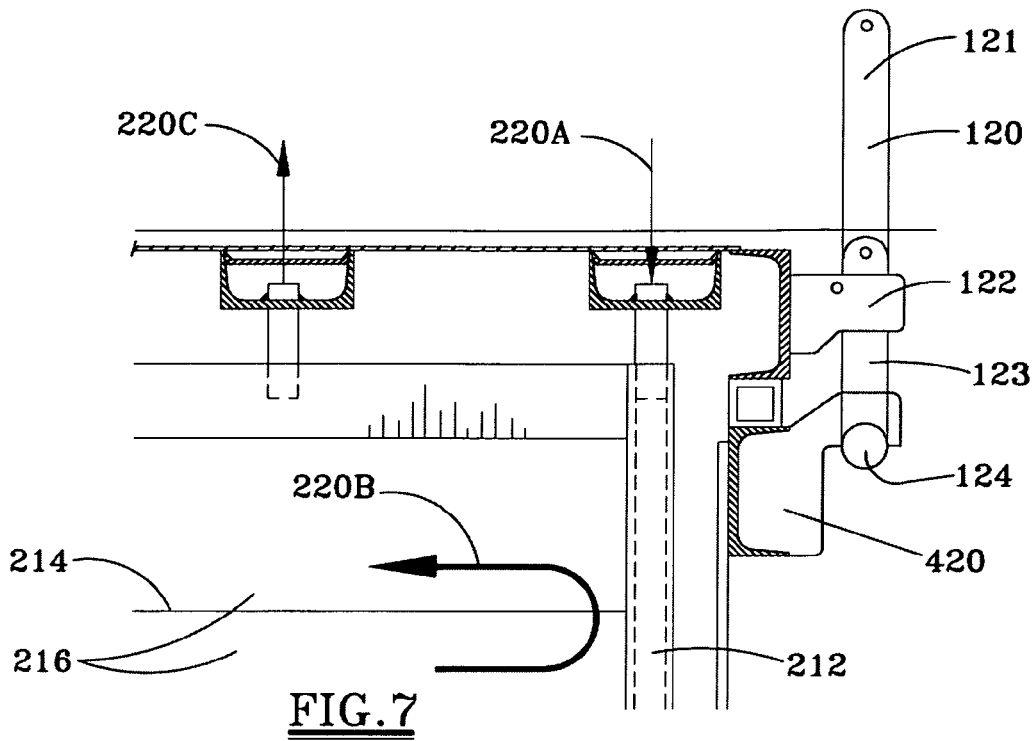
FIG. 7 is a cross sectional, exploded view of a top portion of a heat exchanger plate illustrating a coolant flow pattern, the piping and containment features associated with the reactor of the present invention.

FIG. 7 is a cross sectional, exploded view of a top portion of a heat exchanger plate 210 illustrating a coolant flow pattern, the piping and containment features associated with the reactor of the present invention. There is a coolant flow-in 220A via the entrance channel 212. Thereafter, the coolant flows through the coolant maze 220B defined by the compartments 216 which in turn are defined by the separators 214. The coolant passes out of the coolant maze 220B via the piping for the coolant flow-out 220C. Also illustrated is the clamp 120. The clamp 120 comprises a handle 121, a pivot 122, an arm 123 and a pin 124. The pin 124 removeably engages the retaining member 420 for securing the lid 100 to the sleeve 400.

Figure 8:
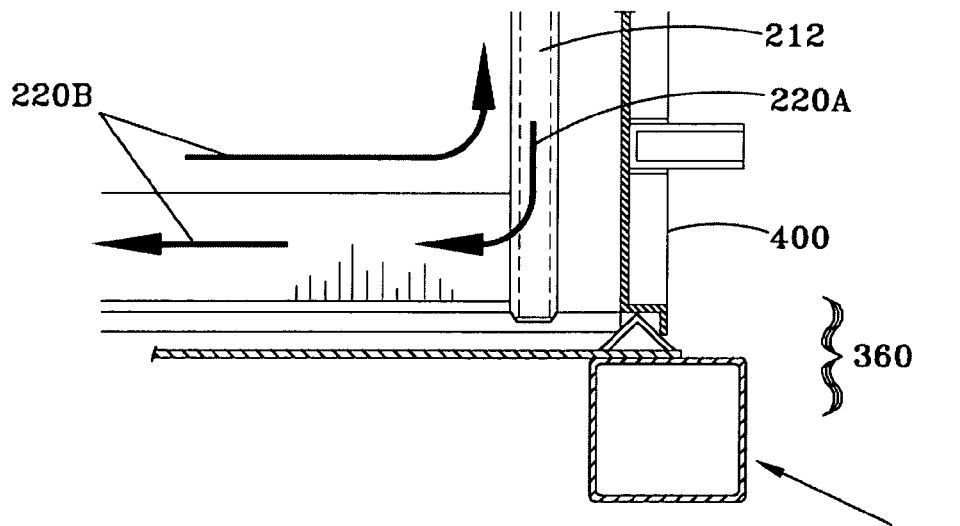
FIG. 8 is a cross sectional, exploded view of a bottom portion of a heat exchanger plate illustrating a coolant flow pattern, the piping and containment features associated with the reactor of the present invention.

FIG. 8 is a cross sectional, exploded view of a bottom portion of a heat exchanger plate 210 illustrating a coolant flow pattern, the piping and containment features associated with the reactor of the present invention. There is a coolant flow-in 220A via the entrance channel 212. Thereafter, the coolant flows through the coolant maze 220B defined by the compartments 216 which in turn are defined by the separators 214. Also illustrated is the engagement of the sleeve 400 and the base 300. The sleeve 400 and the base 300 are in engaging connection because of the seal channel 360.

Figure 9:
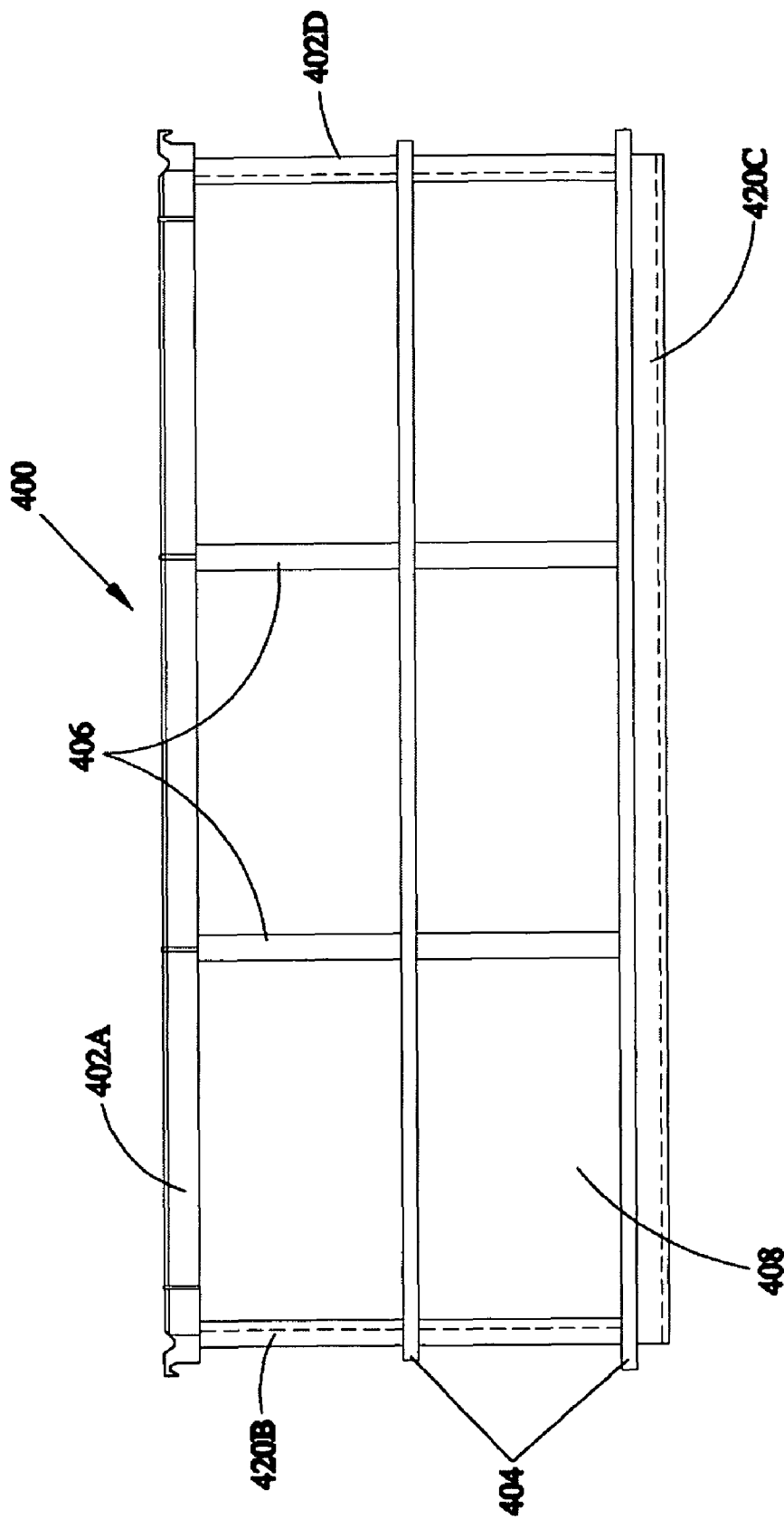
FIG. 9 is an elevation view of the side of a sleeve portion of the reactor of the present invention.

FIG. 9 is an elevation view of the side of a sleeve portion 400 of the reactor of the present invention. The sleeve 400 comprises a plurality of perimeter members 402A,B,C,D, horizontal supports 404, vertical supports 406 and plate 408.

Figure 10:
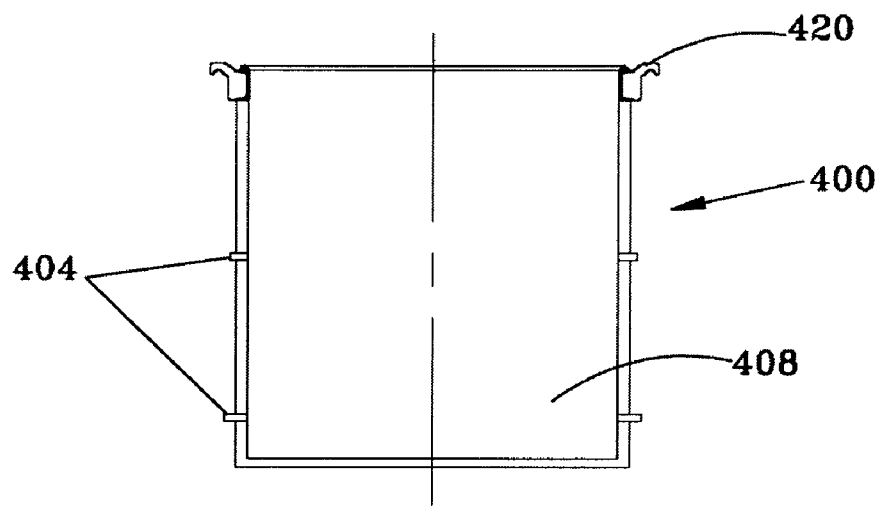
FIG. 10 is an elevation view of the end of the sleeve portion illustrated in FIG. 9 of the reactor of the present invention.

FIG. 10 is an elevation view of the end of the sleeve portion 400 illustrated in FIG. 9 of the reactor of the present invention. The sleeve 400 is illustrated with the horizontal supports 404, the plate 408 and the retaining member 420.

Figure 11:
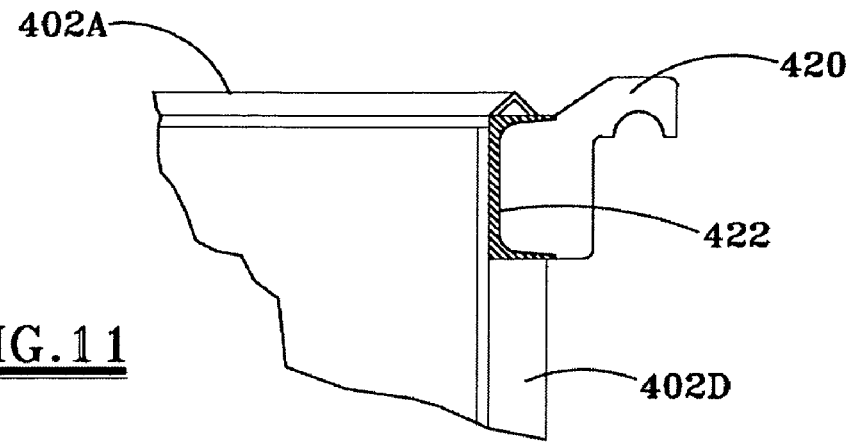
FIG. 11 is a cross sectional, exploded view of a retaining member of the sleeve portion illustrated in FIG. 9 of the reactor of the present invention.

FIG. 11 is a cross sectional, exploded view of a retaining member 420 of the sleeve portion 400 illustrated in FIG. 9 of the reactor of the present invention. The retaining member 420 is fixedly engaged to the sleeve 400 by the weld 422 to the perimeter members 402A,D.

Figure 12:
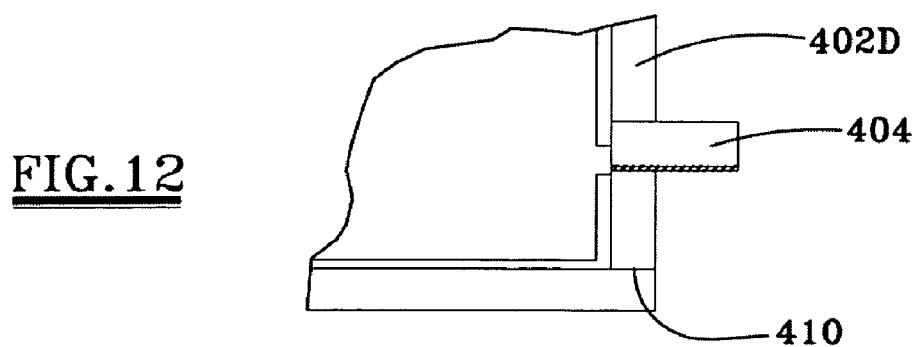
FIG. 12 is a cross sectional, exploded view of a corner of the sleeve portion illustrated in FIG. 9 of the reactor of the present invention.

FIG. 12 is a cross sectional, exploded view of a corner of the sleeve portion 400 illustrated in FIG. 9 of the reactor of the present invention. The sleeve 400 is illustrated with the perimeter member 402 and the support 404. Further, the sleeve 400 is illustrated to show the indenture 410 which is functional with the seal channel 360 illustrated in FIG. 8.

FIG. 13 is an elevation, partial view of the side of the sleeve 400 illustrated in FIG. 9 of the reactor of the present invention. The sleeve 400 has the perimeter members 402, the horizontal supports 404, the vertical supports 406 and the plate 408.

FIG. 14 is an elevation, partial view of the end of the sleeve 400 illustrated in FIG. 9 of the reactor of the present invention. The sleeve 400 has the perimeter members 402, the horizontal supports 404, and the plate 408.

Figure 15:
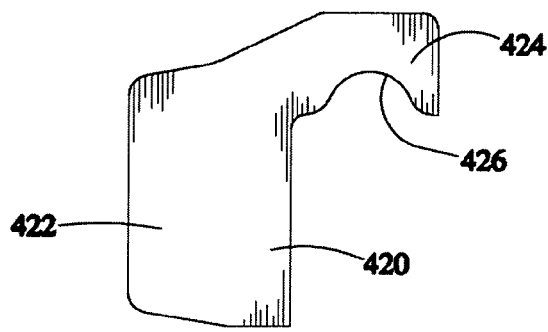
FIG. 15 is a side, exploded view of the retaining member of the sleeve illustrated in FIG. 9 of the reactor of the present invention.

FIG. 15 is a side, exploded view of the retaining member 420 of the sleeve 400 illustrated in FIG. 9 of the reactor of the present invention. The retaining member 420 comprises a central member 422, a hook portion 424 and the hook portion 424 has a receptacle 426.

Figure 16:
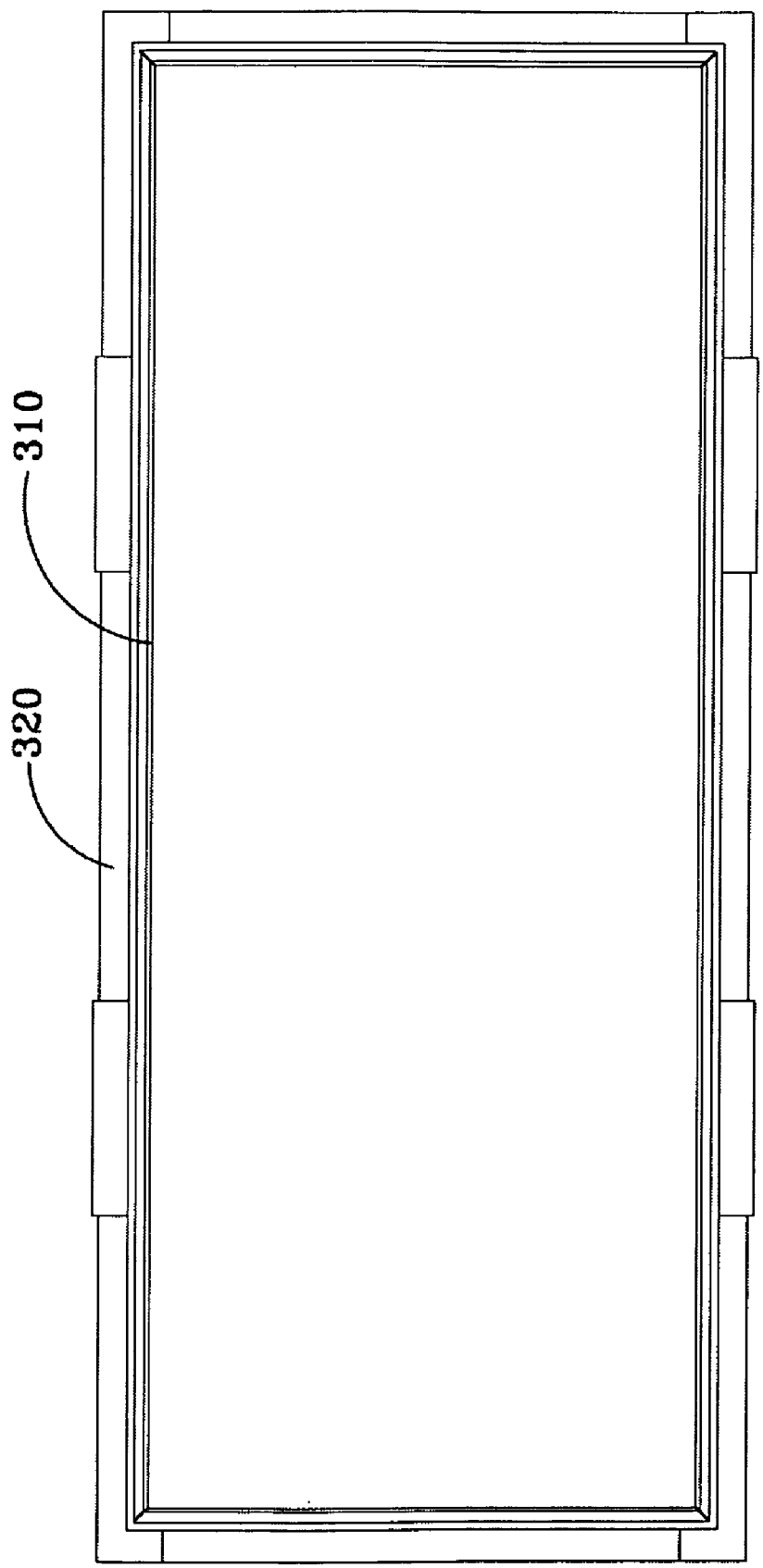
FIG. 16 is a top view of a perimeter of a base of the reactor of the present invention.

FIG. 16 is a top view of a perimeter 320 of a base 300 of the reactor of the present invention. The perimeter 320 has a projection 310 for securely engaging the sleeve 400 (not shown).

Figure 17:
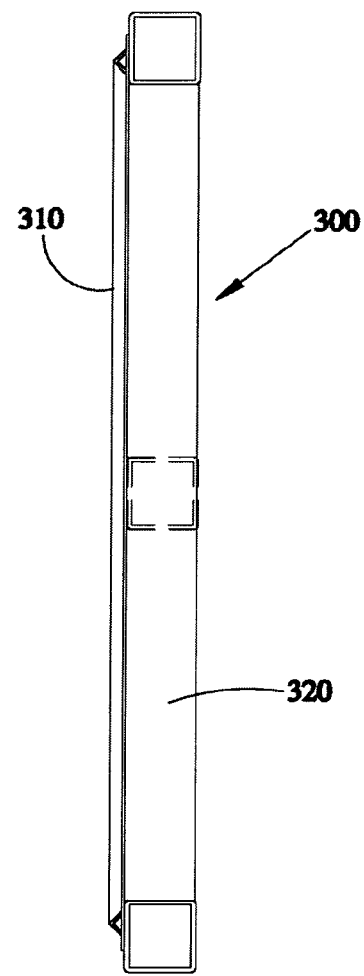
FIG. 17 is an end view of the base illustrated in FIG. 16 of the reactor of the present invention.

FIG. 17 is an end view of the base 300 illustrated in FIG. 16 of the reactor of the present invention. The base 300 comprises a perimeter 320 having a projection 310.

Figure 18:
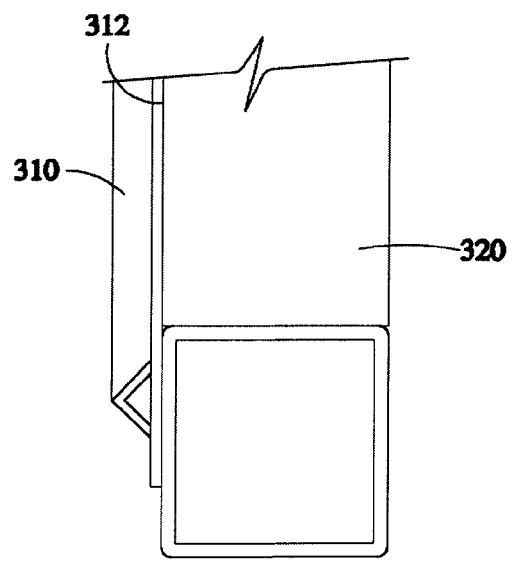
FIG. 18 is an exploded view of the base and the associated containment member illustrated in FIG. 17 of the reactor of the present invention.

FIG. 18 is an exploded view of the base 300 and the associated projection 310 illustrated in FIG. 17 of the reactor of the present invention. The projection 310 has a subplate 312 between it and the perimeter member 320 of the base 300.

Figure 19:
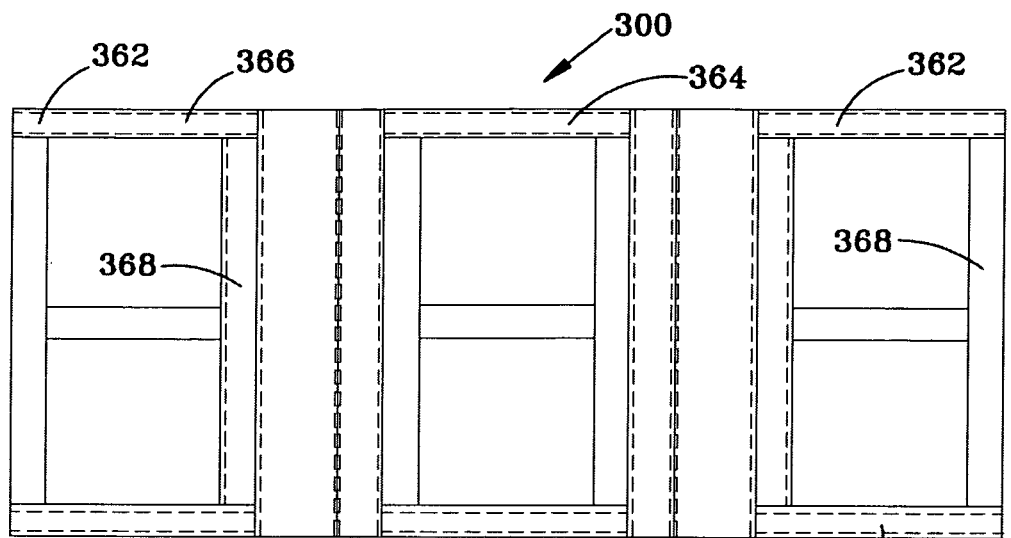
FIG. 19 is a cut-away, top view of a base of the reactor of the present invention.

FIG. 19 is a cut-away, top view of a base 300 of the reactor of the present invention. The base 300 has a plurality of supports 362, 364. The supports 362, 364 are comprised if first members 366 and second members 368. The embodiment illustrated in FIG. 19 provides for a perpendicular relationship between the first members 366 and second members 368.

Figure 20:
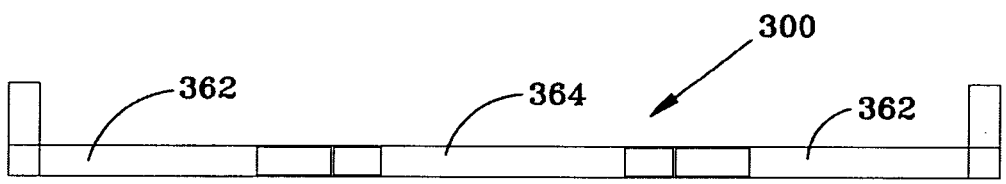
FIG. 20 is an end view of the base illustrated in FIG. 19 of the reactor of the present invention.

FIG. 20 is an end view of the base 300 illustrated in FIG. 19 of the reactor of the present invention. The base 300 is illustrated with a plurality of supports 362, 364.

Figure 21:
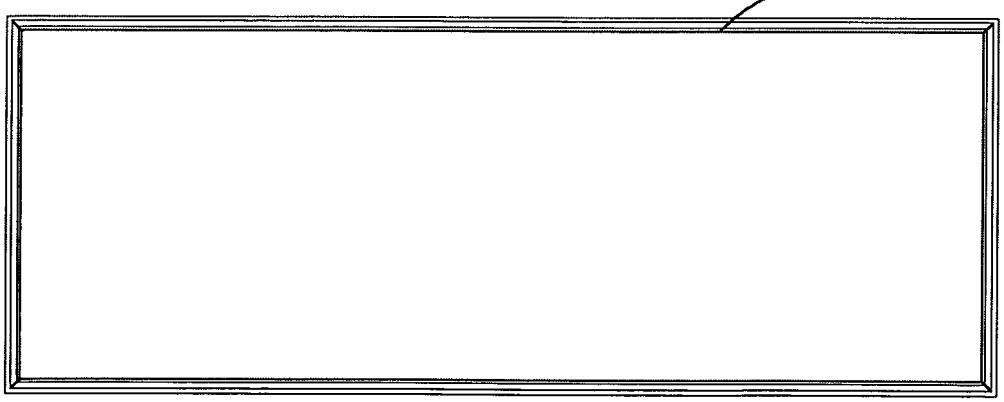
FIG. 21 is a top view of a containment member of a base of the reactor of the present invention.

FIG. 21 is a top view of a projection 310 of a base 300 of the reactor of the present invention.

Figure 22:
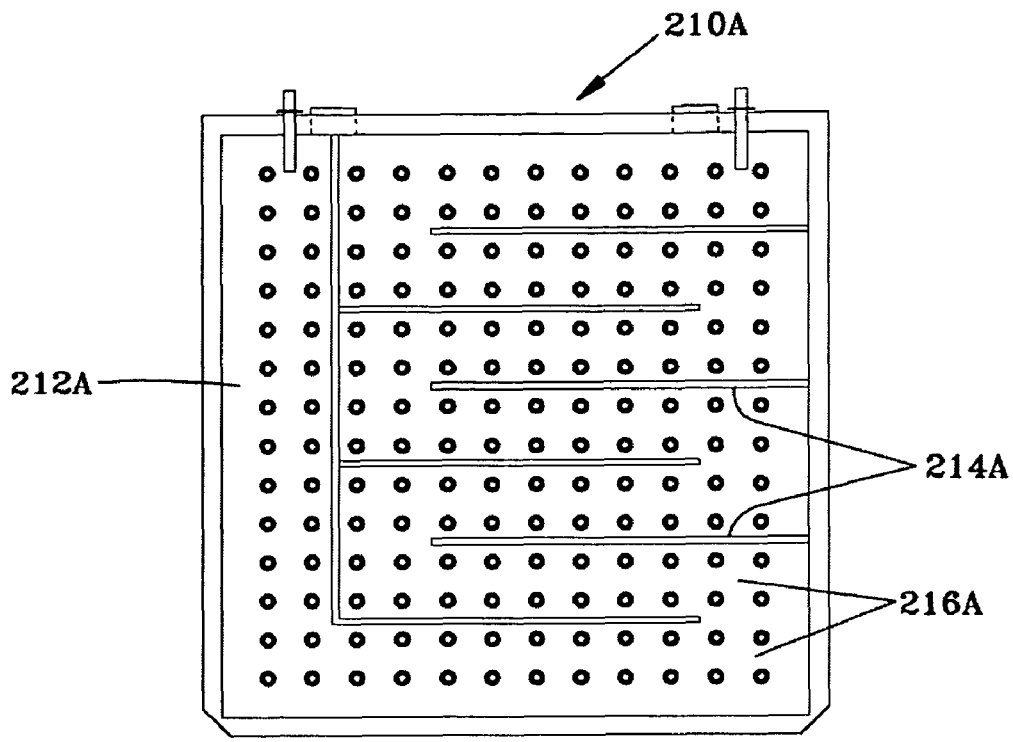
FIG. 22 is a cross sectional, elevation view of a heat exchanger plate illustrating a structure associated with the flow of a cooling fluid associated with the reactor of one embodiment of the present invention.

FIG. 22 is a cross sectional, elevation view of another embodiment of a heat exchanger plate 210A illustrating a structure associated with the flow of a cooling fluid associated with the reactor of the present invention. The heat exchanger plate 210A comprises an entrance channel 212A, a plurality of separators 214A that form a plurality of compartments 216A that form a maze through which the coolant flows. The embodiment in FIG. 22 consists of two plates of aluminum, one flat and one with dimples punched into the plate. The dimples have a ½ inch hole drilled at the center of the dimple. The plates are welded at the edges of the plates and around each hole at the bottom of the dimple. This arrangement creates a ½" inside space within the exchanger everywhere except where the dimples/holes were welded. The welds are to provide strength for holding the pressure inside the exchanger. (up to approximately 60 psi).

FIG. 23 is a perspective view of another embodiment of a reactor 10C of the present invention. The reactor 10C comprises a lid 100C, one or more plates 210C, a sleeve 400C and an attached base 300C.

Figure 24:
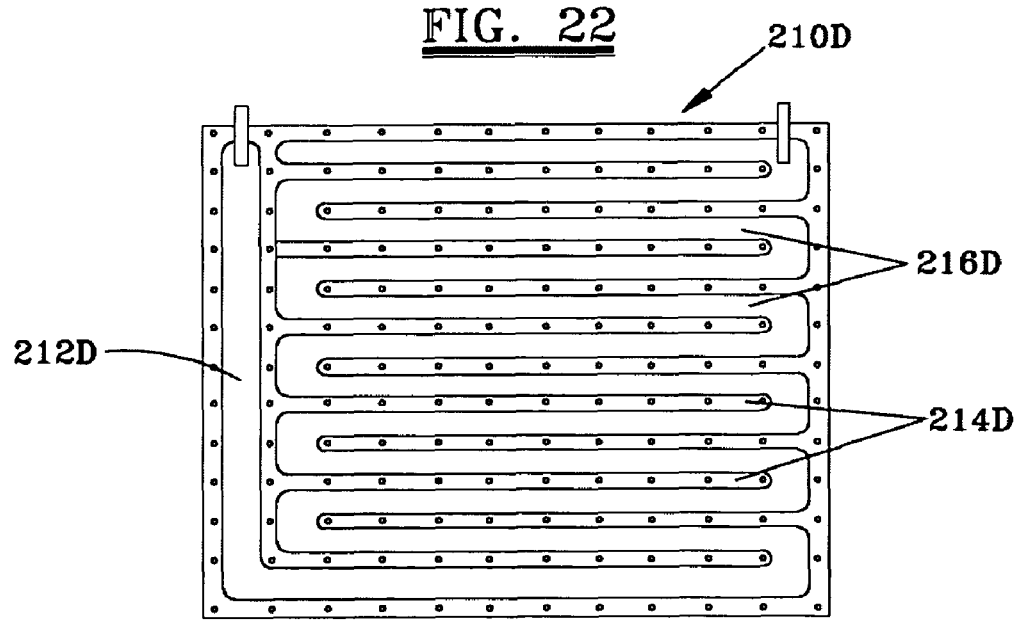
FIG. 24 is a cross sectional, elevation view of another heat exchanger plate illustrating a structure associated with the flow of a cooling fluid associated with the reactor of the present invention.

FIG. 24 is a cross sectional, elevation view of another heat exchanger plate 210D illustrating a structure associated with the flow of a cooling fluid associated with the reactor of the present invention. The heat exchanger plate 210D comprises an entrance channel 212D, a plurality of separators 214D which form a plurality of compartments 216D that form a maze through which the coolant flows.

Figure 25:
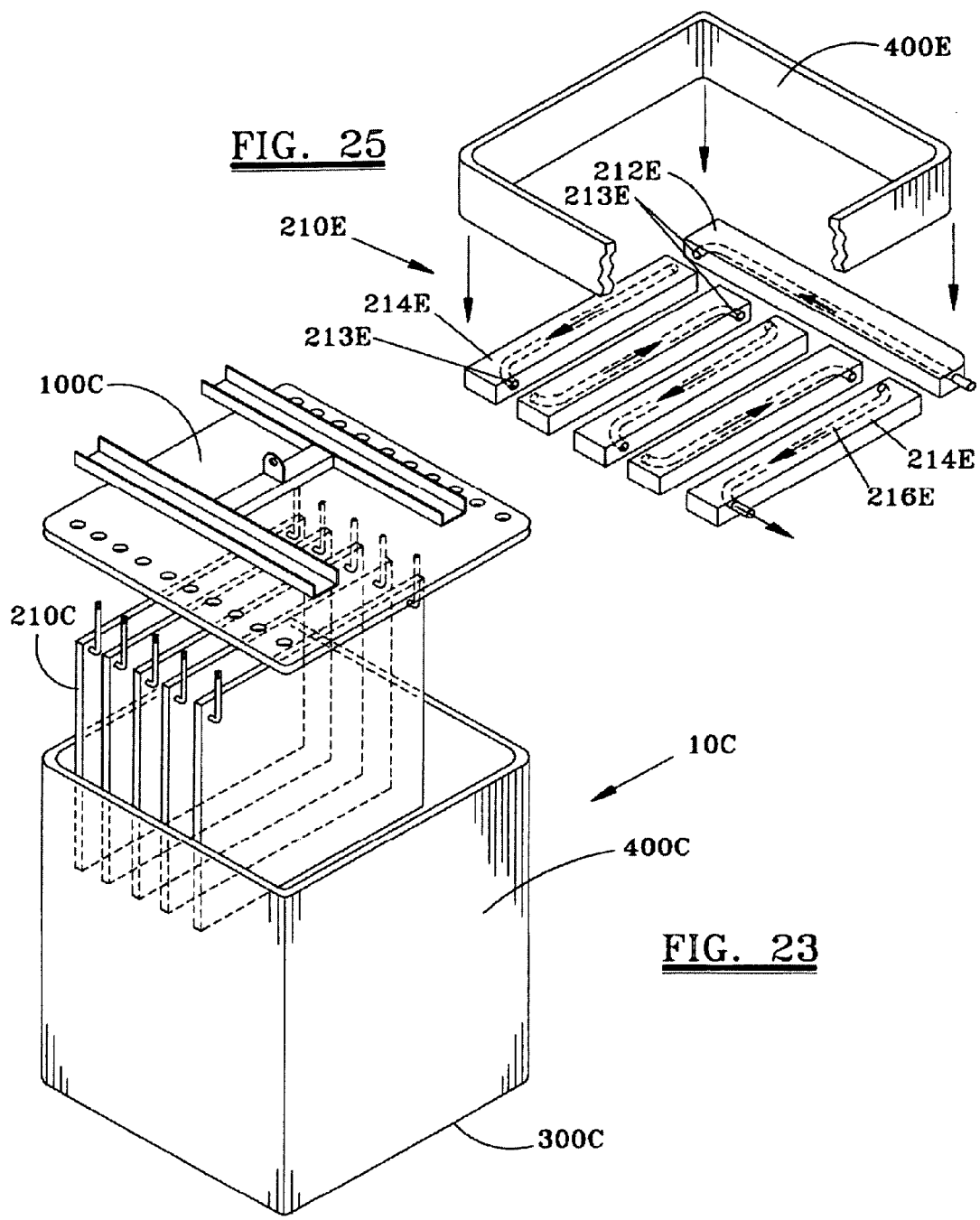
FIGS. 25 and 26 are perspective views of another embodiment of a reactor of the present invention illustrated with horizontal heat exchanger plates.
Figure 26:
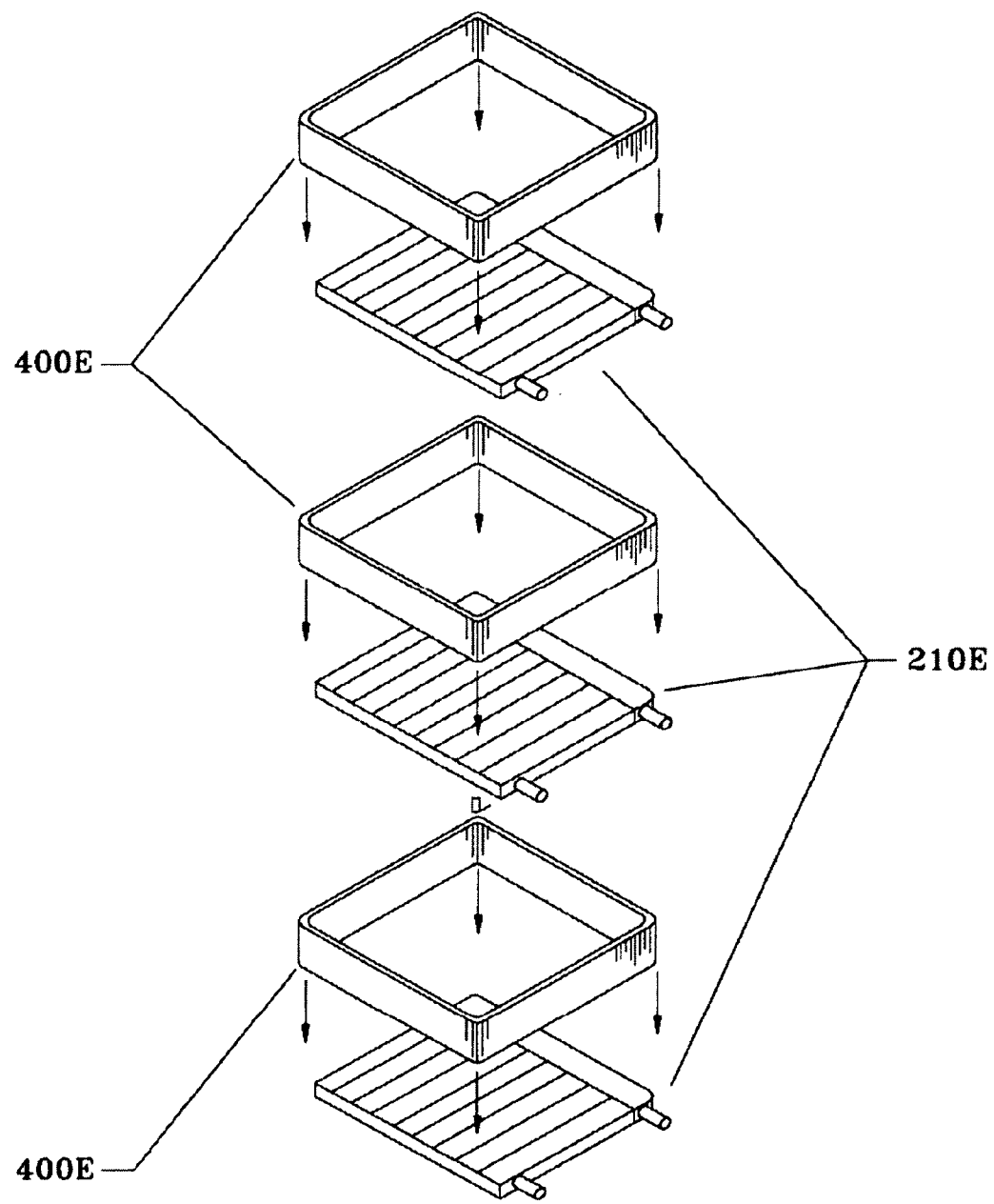

FIGS. 25 and 26 are perspective views of another embodiment of a reactor of the present invention with horizontal heat exchanger plates 210E and one or more sleeve components 400E. The heat exchanger plates 210E comprise a first longitudinal member 212E and one or more lateral members 214E. The first longitudinal member 212E has a flow channel 213E there through. The lateral members 214E also have flow channels 213E. The flow channels 213E of the first longitudinal member 212E and the lateral members 214E are arranged to provide an effective flow path 216E for the coolant. The flow paths can comprise the entire interior of the longitudinal member 212E and the lateral members 214E, or can be of a specific shape within the longitudinal member 212E and the lateral members 214E. Optionally, the reactor has removable trays positioned on top such that the exchangers with trays are then stacked and inserted horizontally into a chamber, with a slight separation between them, where a cooled gas (e.g., nitrogen) is circulated around the trays for the secondary removal of heat.

Figures 27, 28:
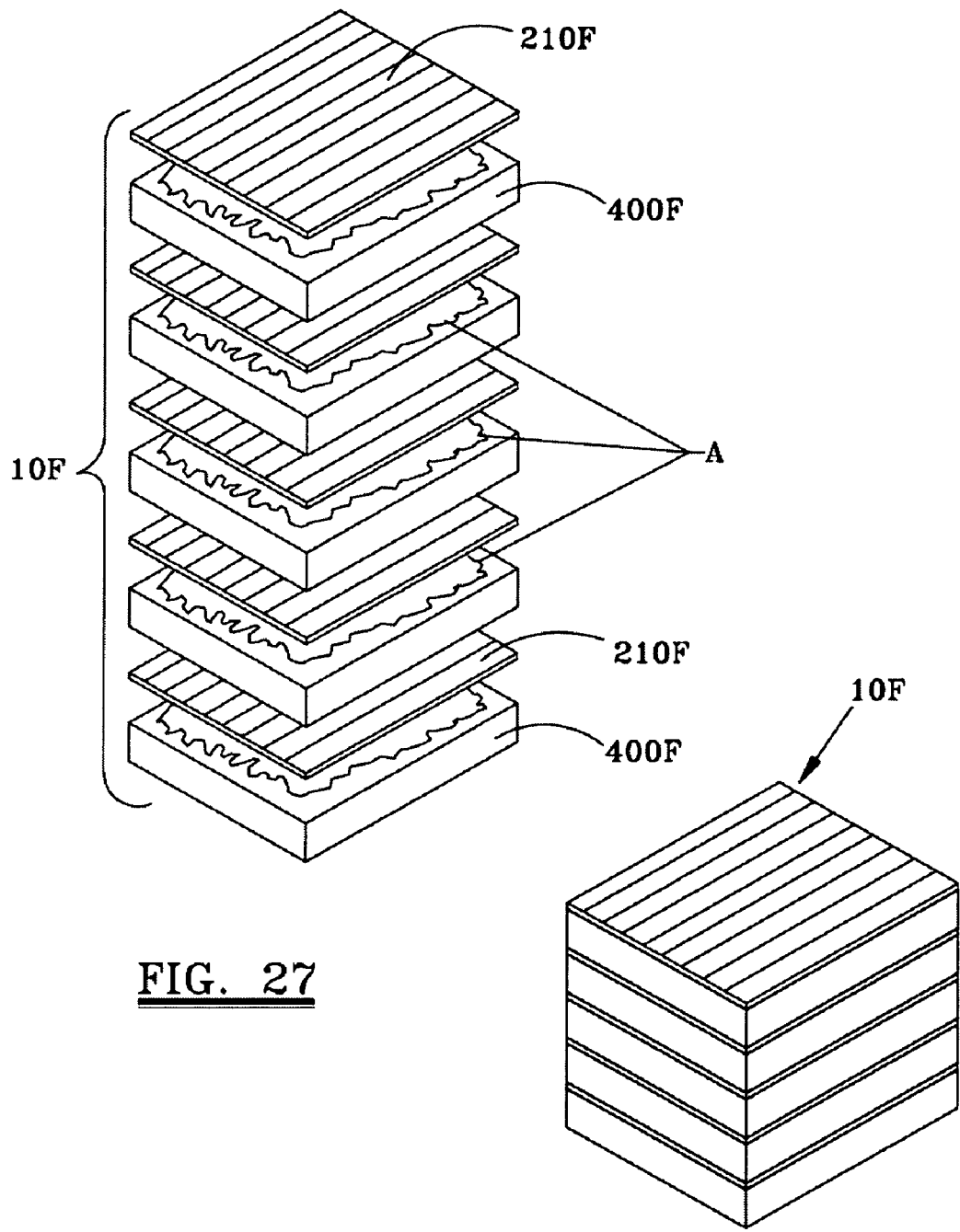
FIGS. 27 and 28 are perspective views of another embodiment of a multi-cell horizontal bulk polymerization reactor of the present invention illustrated with horizontal heat exchanger plates.

FIGS. 27 and 28 are perspective views of another embodiment of a multi-cell bulk polymerization reactor 10F of the present invention. FIG. 27 is an exploded view of the multi-cell bulk polymerization reactor 10F of the present invention. FIG. 28 is an assembled view of the multi-cell bulk polymerization reactor 10F of the present invention. The multi-cell bulk polymerization reactor 10F comprises heat exchanger plates 210F and sleeves 400F. A polymer "A" is illustrated in association with the heat exchanger plates 210F and the sleeves 400F.

Figure 29:
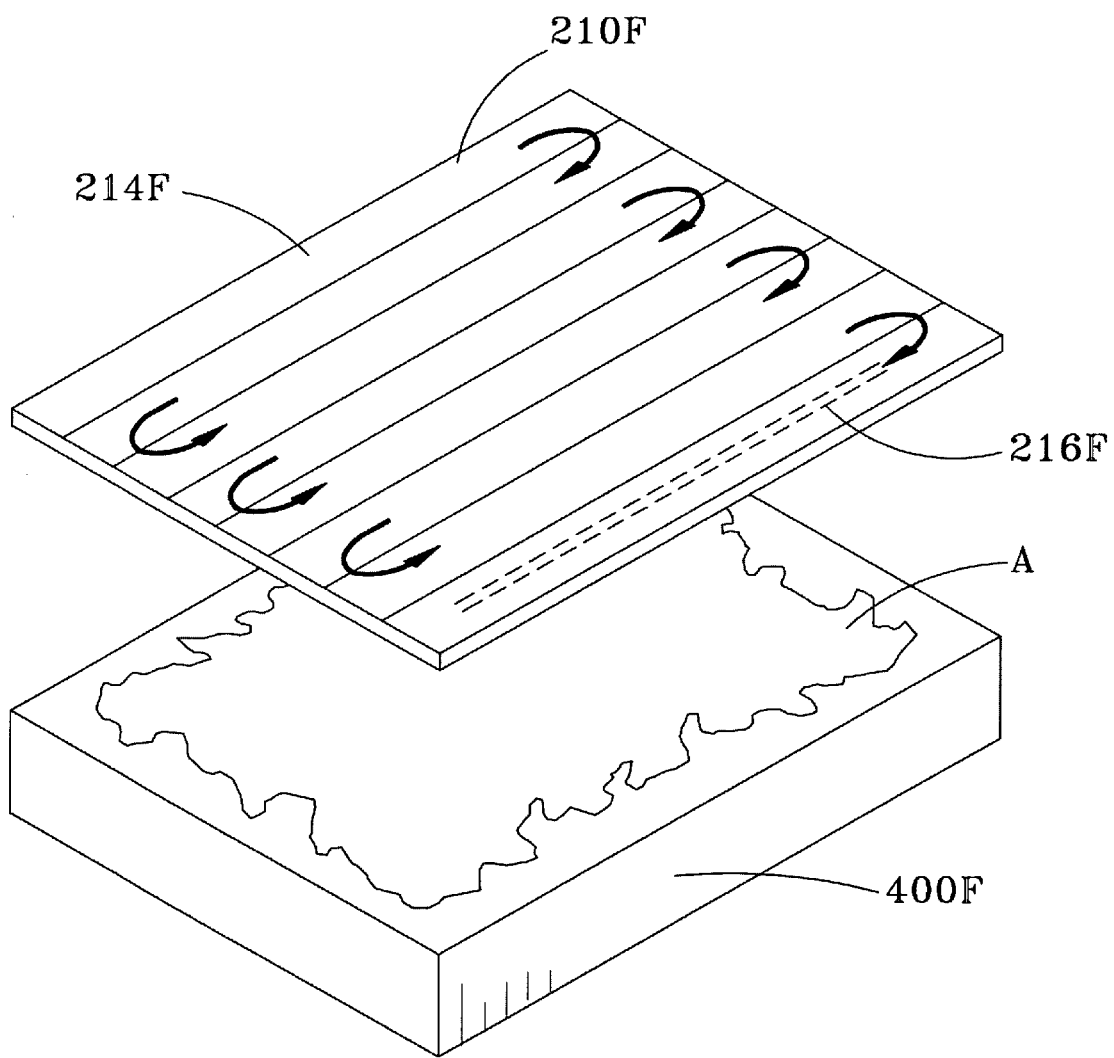
FIG. 29 is a perspective view of another embodiment of a single-cell bulk reactor assembly of the present invention illustrated with a horizontal heat exchanger plate.

FIG. 29 is a perspective view of another embodiment of a single cell bulk reactor assembly of the present invention. The single cell bulk reactor assembly is illustrated with a polymer "A" associated with heat exchanger plate 210F and a sleeve 400F. The heat exchanger plate 210F comprises a plurality of members 214F. The plurality of members 214F comprise cooling channels 216F through which a coolant flows during the polymerization of the polymer A.

Figure 30:
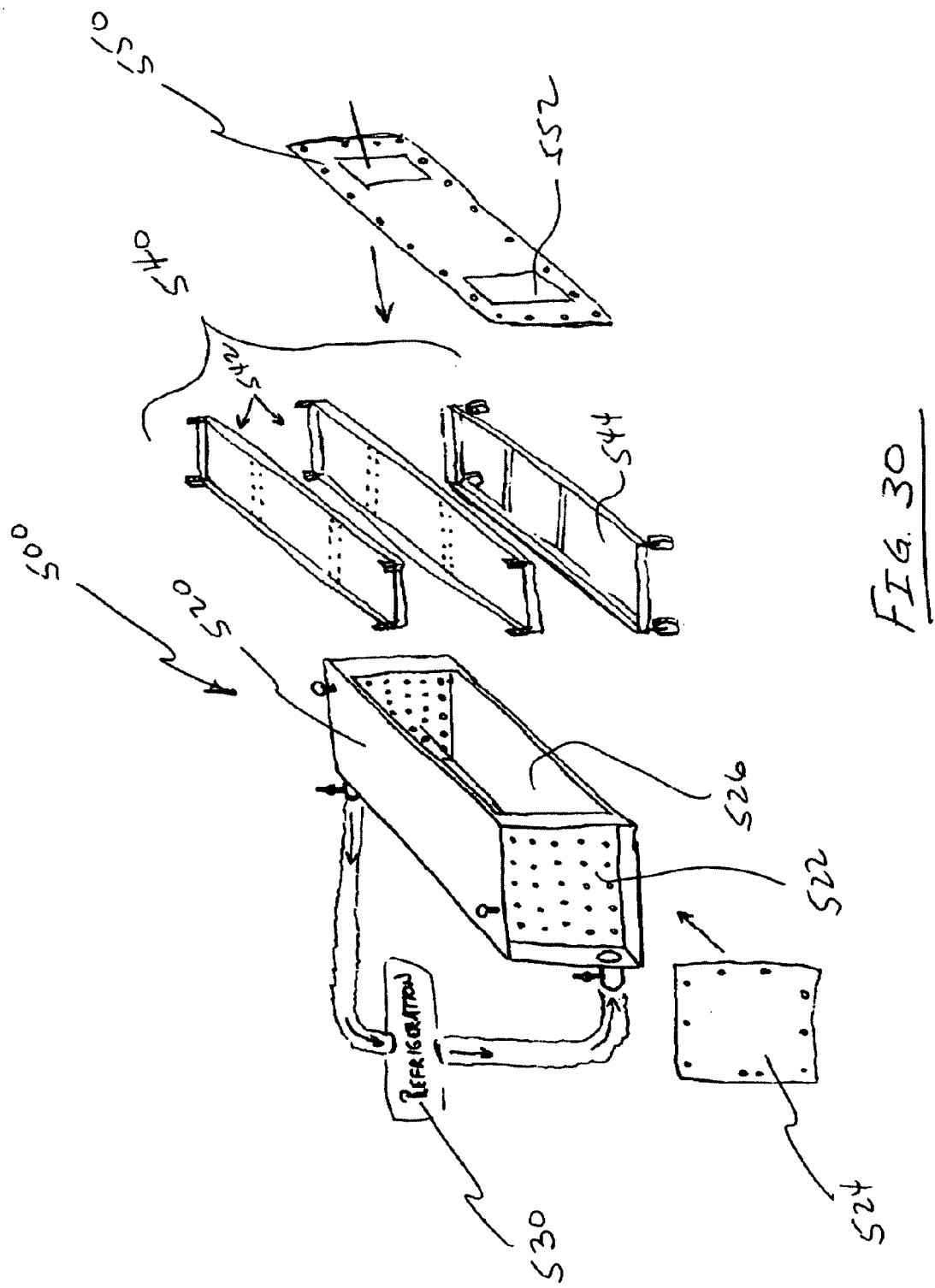
FIG. 30 is a perspective view of another embodiment of the present invention using racks and an airway.

FIG. 30 is a perspective view of another embodiment of the present invention illustrating a rack and airway reactor 500. The rack and airway reactor 500 comprises an enclosure 520, a refrigeration unit 530 and one or more trays 540. The enclosure 520 comprises a reservoir 526 in association with one or more manifold chambers 522. The reservoir 526 and manifold chambers 522 are defined by, for example, the enclosure 520, the plates 524 and the side cover 550. The side cover 550 can have windows 552 for observing the reaction in the reactor 500. Portions of the enclosure 520 and a plate 524 surround the manifold chamber 522. The trays 540 are placed in the reservoir 526 and sealed using the side cover 550. The refrigeration unit 530 provides fluid coolant to the enclosure 520 via the manifold chambers 522. The trays 542 receive polymer that requires specific cooling to achieve the desired DRA. The temperature of the coolant from refrigeration unit 530 is controlled to achieve the temperature required in the reservoir 526 to effectuate the reaction of the polymer required to achieve the desired DRA.

Figure 31:
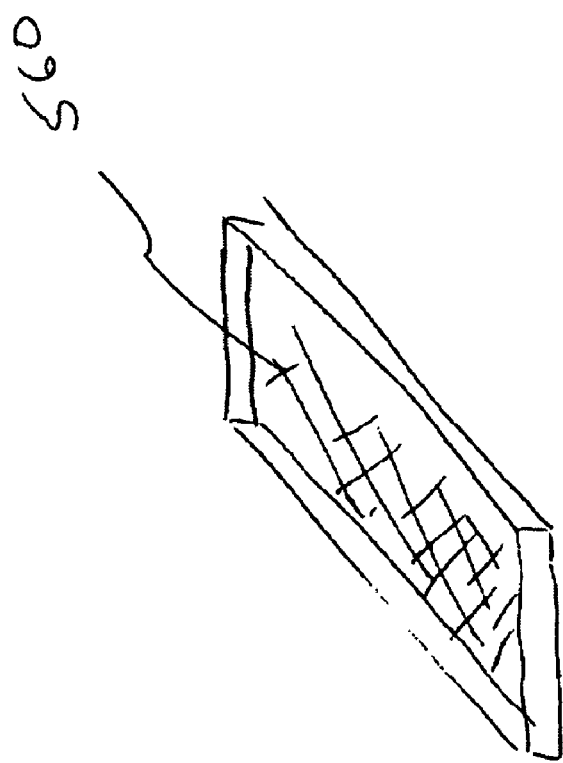
FIG. 31 is a perspective view of a preformed tray liner for use with the rack and airway embodiment illustrated in FIG. 30.

FIG. 31 is a perspective view of a preformed tray liner 560 for use with the rack and airway reactor 500 illustrated in FIG. 30.

Figure 32:
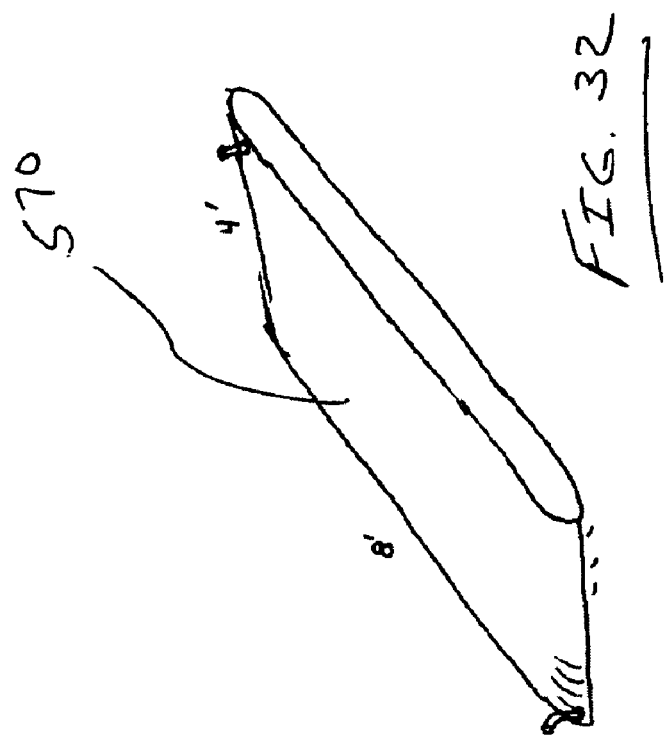
FIG. 32 is a perspective view of a preformed tray bag for use with the rack and airway embodiment illustrated in FIG. 30.

FIG. 32 is a perspective view of a preformed tray bag 570 for use with the rack and airway reactor 500 illustrated in FIG. 30.

It is to be understood that the invention is not limited to the exact details of construction, operation, exact materials, or embodiments shown and described, as obvious modifications and equivalents will be apparent to one skilled in the art. For example, each of the heat exchanger plates may include more than one coolant inlet conduit or more than one coolant outlet conduit. The dimensions and shapes of the polymerization reactors can be easily determined by a person of ordinary skill in the art. Moreover, additional diagnostic gauges may be included as part of the polymerization reactor, e.g., for monitoring temperature, coolant flow rates, coolant inlet and outlet pressures, cavity pressure, etc. during the polymerization reaction. Additionally, the shape of the heat exchanger plates may be any shaped desired or necessary due to the shape of the reservoir, e.g., circularly-shaped, rectangularly-shaped, triangularly-shaped, trapezoidally-shaped, etc. Accordingly, the invention is therefore to be limited only by the scope of the appended claims.

Additional advantages and modification will readily occur to those skilled in the art. The invention in its broader aspects is therefore not limited to the specific details, representative apparatus, and the illustrative examples shown and described herein. Accordingly, the departures may be made from the details without departing from the spirit or scope of the disclosed general inventive concept.

What is claimed is:

1. A bulk polymerization reactor for the bulk polymerization of a large quantity of olefins into a drag-reducing polymer comprising:
    a reservoir; and
    at least one heat exchanger;
    wherein the at least one heat exchanger is removeably disposed within the reservoir, thereby providing a unitary bulk polymerization reactor in which a bulk polyolefin is formed in situ within the reservoir and around the at least one heat exchanger plate within the reservoir.

2. The bulk polymerization reactor of claim 1, further comprising a layer of material defining the interior boundary of the reservoir and the heat exchanger such that the olefins placed within the reservoir cavity engage the layer of material.

3. The bulk polymerization reactor of claim 2, wherein the layer of material having the characteristic of readily disengaging from the heat exchangers and reservoir as well as from the olefins and any resultant polymers.

4. The bulk polymerization reactor of claim 1, further comprising a purging gas for providing a continuous flow throughout the reservoir for enhancing the bulk polymerization of olefins into drag-reducing polymer within the reservoir.

5. The bulk polymerization reactor of claim 1, further comprising a purging gas for providing an inert reaction environment for enhancing the bulk polymerization of olefins into drag-reducing polymer within the reservoir.

6. The bulk polymerization reactor of claim 1, wherein each heat exchanger is disposed at a predetermined distance one from the other.

7. The bulk polymerization reactor of claim 1, further comprising at least one coolant manifold in fluid communication with the coolant source.

8. The bulk polymerization reactor of claim 7, further comprising at least one coolant inlet conduit in fluid communication with at least one coolant inlet manifold and in fluid communication with each of the at least one heat exchanger plates, and at least one coolant outlet conduit in fluid communication with the at least one coolant outlet manifold and in fluid communication with each of the at least one heat exchanger plates.

9. The bulk polymerization reactor of claim 1, wherein the wall includes a plate hanger assembly disposed along the inner wall surface for attaching each of the heat exchangers to the inner wall surface.

10. The bulk polymerization reactor of claim 1, wherein each of the heat exchangers are in fluid communication with a coolant inlet conduit and a coolant outlet conduit.

11. The bulk polymerization reactor of claim 10, wherein each of the coolant inlet conduits is in fluid communication with a coolant inlet manifold and each of the coolant outlet conduits is in fluid communication with a coolant outlet manifold.

12. The bulk polymerization reactor of claim 11, wherein the coolant inlet manifold and the coolant outlet manifold are in fluid communication with the coolant source.

* * * * *